US008994797B2

(12) United States Patent
Yoshino

(10) Patent No.: US 8,994,797 B2
(45) Date of Patent: Mar. 31, 2015

(54) DISPLAY SYSTEM, DISPLAY DEVICE AND DISPLAY ASSISTANCE DEVICE

(75) Inventor: Ken Yoshino, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 448 days.

(21) Appl. No.: 13/429,600

(22) Filed: Mar. 26, 2012

(65) Prior Publication Data

US 2012/0249540 A1 Oct. 4, 2012

(30) Foreign Application Priority Data

Mar. 28, 2011 (JP) ................................. 2011-070576

(51) Int. Cl.
| | | |
|---|---|---|
| *H04N 13/02* | (2006.01) | |
| *H04N 13/04* | (2006.01) | |
| *G09G 5/00* | (2006.01) | |
| *G02F 1/1335* | (2006.01) | |

(52) U.S. Cl.
CPC ....... *H04N 13/0438* (2013.01); *H04N 13/0472* (2013.01); *H04N 2213/008* (2013.01)
USPC .................. 348/51; 348/53; 349/13; 345/156

(58) Field of Classification Search
USPC .................................................. 348/41–161
See application file for complete search history.

(56) References Cited

U.S. PATENT DOCUMENTS

| | | | | |
|---|---|---|---|---|
| 7,567,648 | B2 * | 7/2009 | Tsubaki et al. ................. | 378/41 |
| 7,616,187 | B2 * | 11/2009 | Koo et al. ...................... | 345/156 |
| 8,089,549 | B2 * | 1/2012 | Yasuda et al. ............ | 348/333.02 |
| 8,373,573 | B2 * | 2/2013 | Chou et al. ..................... | 340/689 |
| 8,384,774 | B2 * | 2/2013 | Gallagher ........................ | 348/60 |
| 8,503,737 | B2 * | 8/2013 | Oka et al. ....................... | 382/117 |
| 2007/0021207 | A1 * | 1/2007 | Ahdoot ........................... | 463/36 |
| 2010/0157425 | A1 | 6/2010 | Oh | |

(Continued)

FOREIGN PATENT DOCUMENTS

| | | |
|---|---|---|
| CN | 1749808 A | 3/2006 |
| CN | 101762880 A | 6/2010 |

(Continued)

OTHER PUBLICATIONS

Japanese Office Action dated Feb. 18, 2014 (and English translation thereof) in counterpart Japanese Application No. 2011-070576.

(Continued)

*Primary Examiner* — Joseph Ustaris
*Assistant Examiner* — Talha Nawaz
(74) *Attorney, Agent, or Firm* — Holtz, Holtz, Goodman & Chick PC

(57) ABSTRACT

A display system comprises a display device for accomplishing 3D displays by displaying images for the left eye and images for the right eye, and a display assistance device for separating them for viewing, and the display assistance device detects the wearing status and inclination of the viewer and sends status information to the display device. The display device determines whether or not the posture of the viewer is within a normal viewing range on the basis of the status information, and if this is within the range, can recognize a 3D display even in a posture other than the horizontal direction by controlling the parallax direction of the display of images in accordance with the inclination direction. When the posture is outside the range, the display device prompts correction of the posture or weakens the effect of the 3D display.

18 Claims, 18 Drawing Sheets

(56) References Cited

U.S. PATENT DOCUMENTS

| | | | |
|---|---|---|---|
| 2010/0189413 A1* | 7/2010 | Yoshino | 386/83 |
| 2010/0309204 A1* | 12/2010 | Smith et al. | 345/419 |
| 2011/0102428 A1* | 5/2011 | Mashitani et al. | 345/419 |
| 2011/0102555 A1* | 5/2011 | Yasui | 348/51 |
| 2011/0187638 A1* | 8/2011 | Chao | 345/156 |
| 2011/0199460 A1* | 8/2011 | Gallagher | 348/46 |
| 2011/0248989 A1* | 10/2011 | Park et al. | 345/419 |
| 2011/0254931 A1* | 10/2011 | Lee et al. | 348/53 |
| 2011/0256914 A1* | 10/2011 | Ahdoot | 463/8 |
| 2011/0304472 A1* | 12/2011 | Chou et al. | 340/689 |
| 2011/0310093 A1* | 12/2011 | Kwak et al. | 345/419 |
| 2011/0310097 A1 | 12/2011 | Ushio et al. | |
| 2012/0033048 A1 | 2/2012 | Ogawa et al. | |
| 2012/0033145 A1* | 2/2012 | Ko et al. | 349/13 |
| 2012/0050507 A1* | 3/2012 | Keys | 348/56 |

FOREIGN PATENT DOCUMENTS

| | | |
|---|---|---|
| JP | 11-75223 A | 3/1999 |
| JP | 2000-152285 A | 5/2000 |
| JP | 2001-296501 A | 10/2001 |
| JP | 2005-062389 A | 3/2005 |
| JP | 2008-299036 A | 12/2008 |
| JP | 2010-062767 A | 3/2010 |
| JP | 2010-171608 A | 8/2010 |
| JP | 2010-245648 A | 10/2010 |
| JP | 2010-258583 A | 11/2010 |
| JP | 2011-003992 A | 1/2011 |
| JP | 2011-028263 A | 2/2011 |
| JP | 2011-049630 A | 3/2011 |
| JP | 2012-034229 A | 2/2012 |
| WO | WO 2012/117703 A1 | 9/2012 |

OTHER PUBLICATIONS

Japanese Office Action dated Nov. 12, 2013 (and English translation thereof) in counterpart Japanese Application No. 2011-070576.

Chinese Office Action dated Dec. 30, 2013 (and English translation thereof) in counterpart Chinese Application No. 201210086962.4.

Japanese Office Action dated Jun. 25, 2013 (and English translation thereof) in counterpart Japanese Application No. 2011-070576.

\* cited by examiner

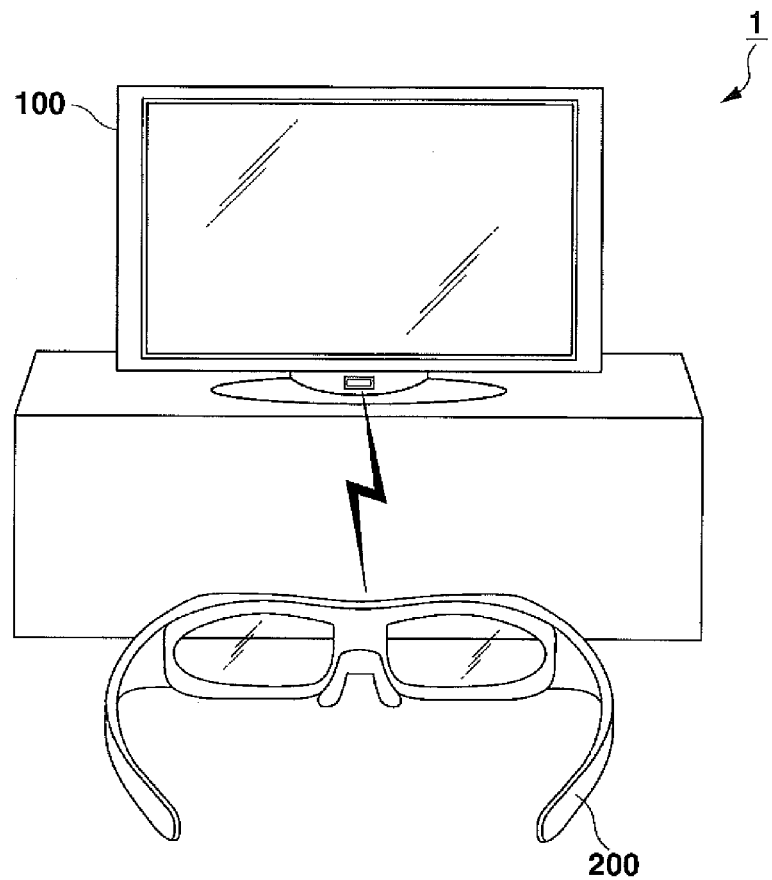
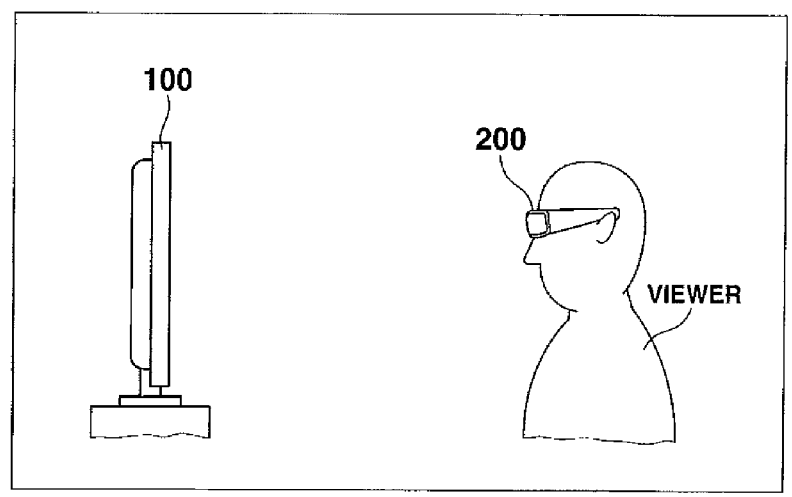

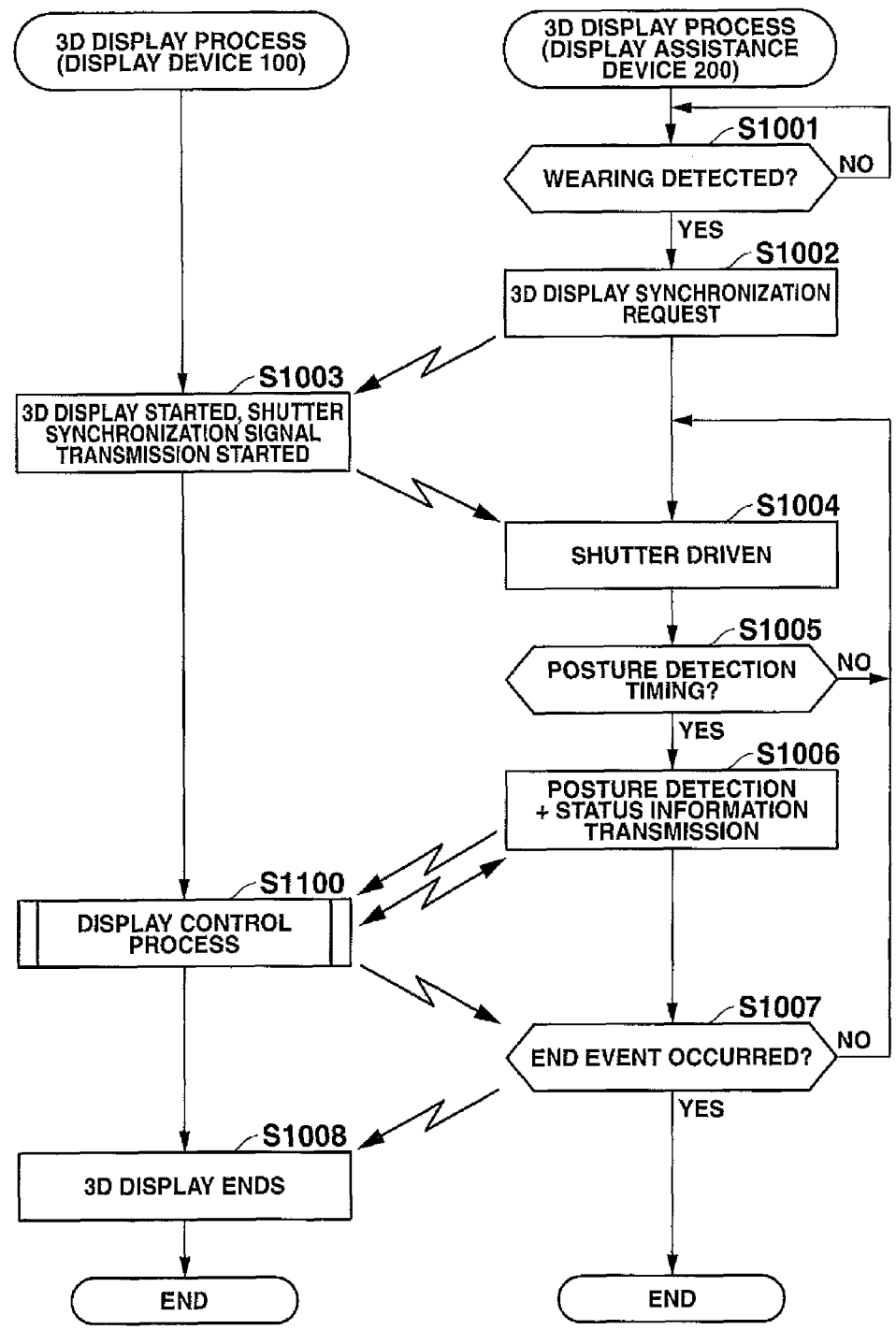

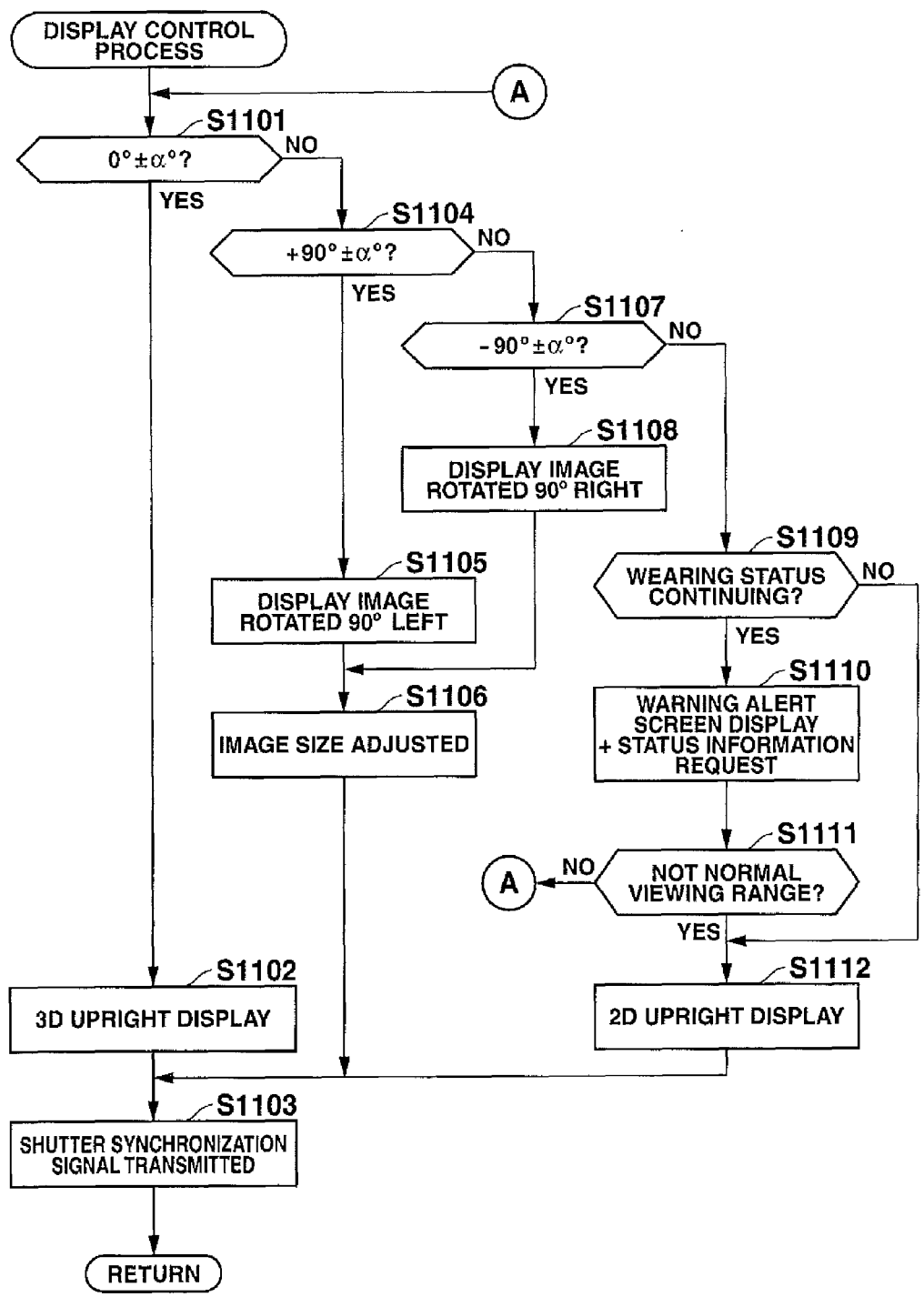

WARNING ALERT SCREEN

2D DISPLAY

3D DISPLAY (STRENGTH: WEAK)

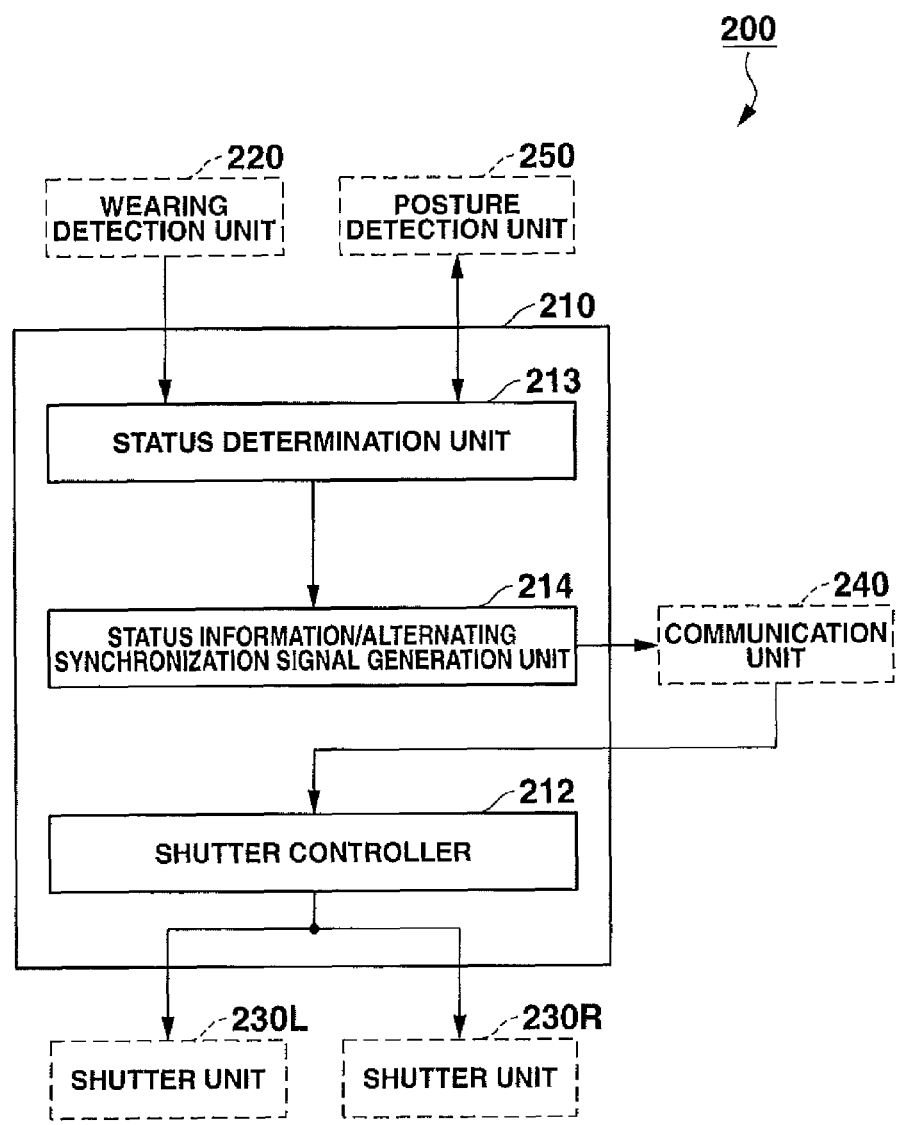

DISPLAY SYSTEM, DISPLAY DEVICE AND DISPLAY ASSISTANCE DEVICE

CROSS-REFERENCE TO RELATED APPLICATION

This application claims the benefit of Japanese Patent Application 2011-070576, filed Mar. 28, 2011, the entire disclosure of which is incorporated by reference herein.

FIELD

This application relates generally to a display system, display device and display assistance device, and more particularly, to a display system, display device and display assistance device suitable for 3D displays.

BACKGROUND

With advances in digital video technologies, so-called 3D display technology, which causes display images to be seen as three-dimensional, is becoming popular.

Such 3D display technology is being adopted primarily in television display devices and personal computers, but the possibility exists of broadly applying this to all devices accompanied by display screens (for example, digital photo frames and/or the like).

Methods for realizing 3D displays primarily include those (glasses type) that cause a 3D display to be recognized using display assistance devices such as special eyeglasses that a viewer wears to look at the display screen, and those (naked eye type) that cause a 3D display to be recognized with the naked eye without using this kind of display assistance device.

In television display devices and the like, the glasses type 3D display system is widely used.

For example, in Unexamined Japanese Patent Application KOKAI Publication No. 2010-62767, a shutter system called a time division system such as so-called frame sequential system is disclosed as a method for realizing a higher quality glasses-type 3D display.

This system is one in which display devices alternately displaying images for the right eye and images for the left eye are synchronized and a liquid crystal shutter and/or the like is incorporated into the lens portion of the glasses and operates so that images for the right eye reach only the right eye and images for the left eye reach only the left eye.

Particularly in television display devices, such glasses-type approaches are more suitable than naked eye types due to the fact that there are no restrictions on viewing position, and moreover, from an image quality viewpoint, such time-division systems are suitable because there is no deterioration of spatial resolution.

Because right-eye images and left-eye images are images shifted in the left-right direction in accordance with binocular parallax in the horizontal direction when video is shot, viewing such video as a 3D display requires the viewer to view with a posture such that the horizontal direction of the display screen and the left-right direction of the viewer's eyes are in the same direction within a prescribed range (hereafter referred to as "normal viewing range").

That is to say, because the posture of the viewer relative to the display screen must be fixed within a prescribed range, this has the inconvenience that there is little freedom in the viewer's posture.

Furthermore, when the direction of the binocular parallax in the video and the left-right direction of the viewer diverge due to viewing in a posture that is not in the normal viewing range, not only are the images not seen as a 3D display, but due to continuously viewing unnaturally shifted images, so there are concerns of negative physiological effects could occur, such as visual strain or eyestrain.

In addition, the object that is to be viewed three-dimensionally when viewing a 3D display is not actually shown as a three-dimensional object but is recognized three-dimensionally in the brain due to binocular parallax, so viewing as a 3D display is accomplished through a physiological stereopsis function.

Formation of the stereopsis function through binocular parallax is said to be completed by around age 5-6, so there are concerns that negative physiological effects could arise, when an infant in which formation of the stereopsis function is immature, or an elderly person in which the stereopsis function has degraded, views a 3D display.

Hence, a method is desired for effectively preventing individuals with these conditions from viewing a 3D display.

In consideration of the foregoing, it is an object of the present invention to provide a display system, display device and display assistance device with which a 3D display can be appropriately viewed.

SUMMARY

In order to achieve the above object, the display system according to a first aspect of the present invention is:

a display system comprising a display device that accomplishes a 3D display by displaying images for a right eye and images for a left eye; and a display assistance device for separating the display into the images for the left eye and images for the right eye and causing such to be seen;

wherein the display assistance device comprises:

a status detector for detecting the status of the display assistance device; and a transmitter for transmitting status information indicating detection results from the status detector to the display device; and the display device comprises:

a receiver for receiving status information transmitted by the transmitter; and a display controller for controlling the 3D display on the basis of the status information received by the receiver.

In order to achieve the above object, the display device according to a second aspect of the present invention is:

a display device for realizing a 3D display by cooperating with a display assistance device for separating the display into images for a left eye and images for a right eye and causing such to be seen, comprising:

a receiver for receiving status information indicating the inclination of the display assistance device and/or the wearing status of the display assistance device on a viewer viewing a display screen of the display device; and a display controller for accomplishing display control relating to the 3D display on the basis of the status information received by the receiver.

In order to achieve the above object, the display assistance device according to a third aspect of the present invention is:

a display assistance device that realizes a 3D display by separating into images for a right eye and images for a left eye through a display device, comprising:

a status detector for detecting the inclination of the display assistance device and/or the wearing status of the display assistance device on a viewer viewing a display screen of the display device;

a status information generator for generating status information for causing control of display actions of the display device, on the basis of the status of the display assistance device detected by the status detector; and a transmitter for transmitting to the display device status information generated by the status information generator.

BRIEF DESCRIPTION OF THE DRAWINGS

A more complete understanding of this application can be obtained when the following detailed description is considered in conjunction with the following drawings, in which:

FIG. 1A is an oblique view showing an example of a display device and display assistance device in a display system according to a first embodiment of the present invention;

FIG. 1B schematically shows the positional relationship between the display device and display assistance device in a display system according to the first embodiment of the present invention;

FIG. 6 is a flowchart for explaining the "3D display process" according to the first embodiment of the present invention;

FIG. 7 is a flowchart for explaining the "display control process" executed in the "3D display process" shown in FIG. 6;

FIG. 13 is a function block diagram showing functions realized by the controller of the display assistance device according to a second embodiment of the present invention;

DETAILED DESCRIPTION

The preferred embodiments of the present invention are described below with reference to the drawings.

(Embodiment 1)

A display system 1 according to a first embodiment of the present invention is explained below with reference to FIGS. 1A and 1B.

FIGS. 1A and 1B schematically show the display system 1 according to the first embodiment.

The display system 1 according to this embodiment is a display system that can cause the display image to be recognized three-dimensionally in the brain of the viewer, in other words can accomplish a 3D display (three-dimensional display), and as shown in FIG. 1A, comprises a display device 100 and a display assistance device 200.

Suppose that the display device 100 according to this embodiment is for example a tabletop television display device and suppose that a display of video (images) is accomplished through digital processing.

In addition, the display assistance device 200 according to this embodiment is a device in the shape of eyeglasses (3D glasses) and as shown in FIG. 1B is worn by a person (viewer) viewing the display screen of the display device 100 in the same form as wearing regular eyeglasses.

The display system 1 according to this embodiment invention realizes 3D display through cooperation between the display device 100 and the display assistance device 200.

That is to say, the display device 100 alternately displays images for the right eye and images for the left eye (time division system), and the display assistance device 200 accomplishes shutter action in synchronous with the display on the display device 100 (shutter system), and through this the images for the right eye and the images for the left eye are viewed separately and recognized as a 3D display by the viewer.

The respective compositions of the display device 100 and the display assistance device 200 that comprise this kind of display system 1 are described below with reference to the drawings.

First, the composition of the display device 100 is described with reference to FIGS. 2A, 2B and 3.

Figure 2A:
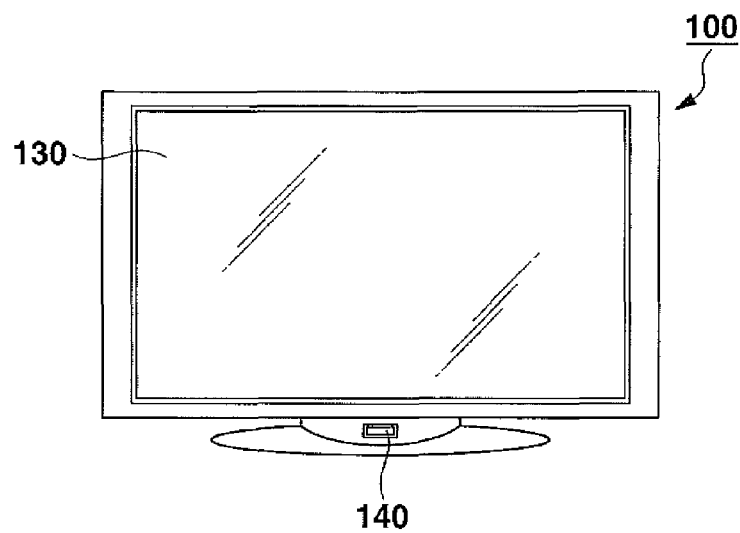
FIG. 2A shows an example of the external composition of the display device in the display device shown in FIG. 1A.
Figure 2B:
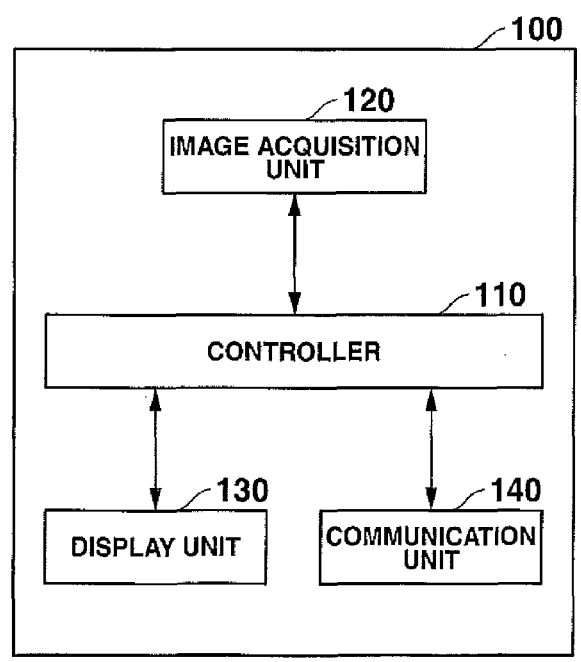
FIG. 2B is a block diagram showing the internal composition of the display device shown in FIG. 1A.

FIG. 2A schematically shows the external composition of the display device 100 and FIG. 2B is a block diagram showing the internal composition of the display device 100.

As shown in FIG. 2B, the display device 100 includes a controller 110, an image acquisition unit 120, a display unit 130 and a communication unit 140.

The controller 110 includes for example of a CPU (Central Processing Unit) or a memory device (primary memory device or auxiliary memory device), creates various control signals by executing logical processes, and controls the various units of the display device 100.

When the control target is an analog circuit, the signal is appropriately converted to an analog control signal by a DAC (Digital-Analog Converter).

The image acquisition unit 120 has a composition for acquiring data and signals showing pictures (images) to be displayed by the display device 100.

The display device 100 according to this embodiment is a television display device, and hence the commonly known composition (e.g., receiver circuits, tuner circuits, demodulation circuits and/or the like) necessary for receiving digital broadcasts such as digital terrestrial television broadcasts, for example, is the primary composition of the image acquisition unit 120.

The display device 100 may also acquire picture (image) data from an external device connected to the display device 100 (for example, a picture playback device (player) that reads and reproduces image data recorded on various types of disk media (e.g., DVD (Digital Versatile Disc) or a hard disk and/or the like) or memory media (e.g., a memory card and/or the like)).

The commonly known composition (e.g., connection terminals, signal conversion circuits, demodulation circuits and/or the like) necessary for connecting to this kind of external device is included in the image acquisition unit 120.

The aforementioned image playback device (player) may be composed inside the display device 100.

In this case, the commonly known composition (e.g., devices for mounting various types of media, memory devices, devices for reading and writing to media and memory devices, and/or the like) necessary for realizing the image reproduction device (player) is included in the image acquisition unit 120.

In addition, the picture (image) data may be acquired from a communications network such as the Internet, for example.

In this case, the commonly known composition (e.g., connection terminals, communications devices, demodulation circuits and/or the like) necessary for connecting to and communicating with a communications network is included in the image acquisition unit 120.

The display unit 130 comprises a flat-panel display such as a liquid crystal display panel, a plasma panel, an organic EL panel and/or the like, and displays and outputs the picture (image) acquired by the image acquisition unit 120.

As described above, the display system 1 according to this embodiment accomplishes 3D displays through a shutter system, and hence when this 3D display is accomplished, images for the right eye and images for the left eye are alternately displayed in the display unit 130 through control (described in detail below) by the controller 110.

The communication unit 140 is a composition for communicating with the display assistance device 200.

The communication unit 140 according to this embodiment is one that accomplishes wireless communication through infrared communication, for example, and the communication unit 140 includes the commonly known composition (e.g., a signal conversion circuit, an infrared light transceiver and/or the like) for realizing this kind of infrared communication.

In this case, light transceiver of the communication unit 140 is placed for example at the position indicated by a reference number 140 in FIG. 2A.

In other words, the light transceiver is placed at a position where light emitted toward the display assistance device 200 can be received and light emitted from the display assistance device 200 can be received when a viewer wearing the display assistance device 200 is facing the display device 100 as shown in FIG. 1B.

The communication format with the display assistance device 200 is arbitrary, and a wireless format using radio waves may be used.

Communication with the display assistance device 200 is preferably this kind of wireless communication, but this may be wired communication by connecting to and communicating with the display assistance device 200 by means of a prescribed cable.

Hence, in an existing 3D display system using the shutter system, signals for synchronizing the shutter action at the display assistance device with the display in the display device are transmitted to the display assistance device from the display device.

Because a similar action is accomplished in the display system 1 according to this embodiment, the communication unit 140 is realized on the basis of the same composition as that used in an existing display system.

However, in the display system 1 according to this embodiment, display control is accomplished on the basis of detection results in the display assistance device 200 (described in detail below), so it is necessary for the display device 100 to receive signals from the display the display assistance device 200 and to send signals to it.

Hence, the communication unit 140 of the display device 100 has a composition that can not only transmit-signals to the display assistance device 200 but also receive signals transmitted from the display assistance device 200.

The various processes according to the action of the display device 100 having the above composition are realized by the controller 110 executing programs.

The functions realized by the controller 110 are explained with reference to FIG. 3.

Figure 3:
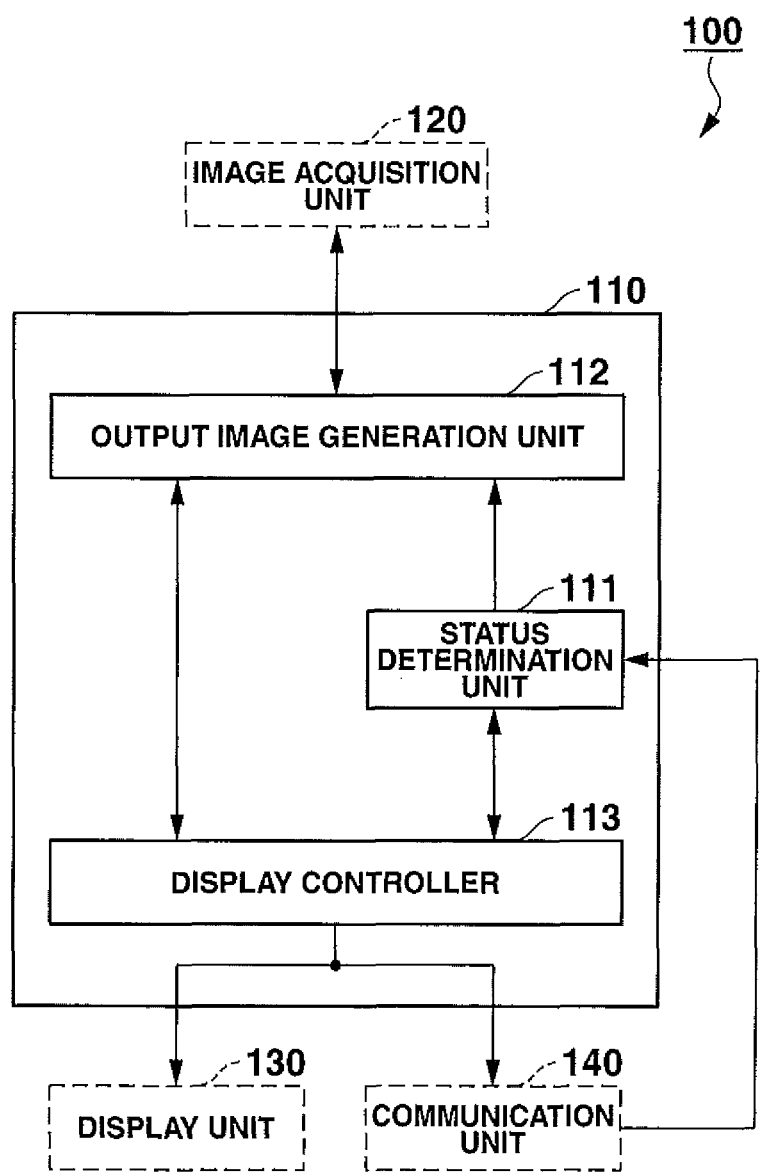
FIG. 3 is a function block diagram showing the functions realized by a controller shown in FIG. 2B.

FIG. 3 is a function block diagram showing functions realized by the controller 110.

As shown in the figure, in this embodiment, a status determination unit 111, an output image generation unit 112, a display controller 113 and/or the like are realized by the control unit 110.

The status determination unit 111 determines the status of the display assistance device 200 on the basis of signals (described in detail below) which the communication unit 140 receives from the display assistance device 200, and sends instructions in accordance with the determination results to the output image generation unit 112 and the display controller 113.

In this embodiment, the controller 110 determines the wearing status and posture of the display assistance device 200 on the basis of signals sent from the display assistance device 200 and accomplishes instructions to the output image generation unit 112 and the display controller 113 so as to make a display in accordance with the determination results.

The output image generation unit 112 generates an image caused to be displayed on the display unit 130 on the basis of picture (image) data acquired by the image acquisition unit 120, and outputs such to the display controller 113.

In this embodiment, in addition to generating an image (frame image) on the basis of picture (image) data acquired and demodulated by the image acquisition unit 120, a screen showing a message urging the viewer to be cautious (hereafter called a "warning alert screen") and/or the like is generated.

A default screen such as a warning alert screen may be prepared in advance.

In this case, image data stored in advance on an unrepresented auxiliary memory device (e.g., a hard disk device and/or the like) comprising the controller 110 is read by the output image generation unit 112.

When a 3D display is accomplished in the display device 100, in general image data (hereafter called "3D image data") is used in which images for the right eye and images for the left eye (hereafter, these two together shall be called "binocular images") are included on the basis of the binocular parallax when video is shot.

However, when image data which is on the basis of images (monocular images) not containing binocular images obtained by a conventional shooting method (hereafter called "2D image data") is input from the image acquisition unit 120, a conversion from the 2D image data to 3D image data (rendering 3D), in other words a 2D/3D conversion, may be accomplished by the output image generation unit 112.

In this case, the output image generation unit 112 accomplishes a real-time conversion from the 2D image data input from the image acquisition unit 120 to 3D image data through an online conversion (e.g., segmentation) using commonly known 2D/3D conversion technology.

Through this kind of 2D/3D conversion, images for the right eye and images for the left eye are generated from monocular images.

The display controller 113 displays and outputs to the display unit 130 the images generated by the output image generation unit 112 on the basis of instructions from the status determination unit 111, by controlling the display unit 130.

Here, the display controller 113 controls the display unit 130 such that the images for the right eye and images for the left eye are alternately displayed when accomplishing a 3D display.

In this case, the display controller 113 generates a shutter synchronization signal for synchronizing the alternating display and the shutter action of the display assistance device 200, and sends such to the display assistance device 200 via the communication unit 140.

In this embodiment, these functions are realized by logical processes through the controller 110, but all or a portion of the above-described functions may be realized by a hardware process such as an ASIC (Application Specific Integrated Circuit) and/or the like.

In particular, the functions relating to image processing may be realized by a dedicated circuit such as an image processing engine and/or the like.

The above is the composition of the display device 100 according to this embodiment of the present invention, and a detailed explanation is omitted for other compositions necessary as a display device as appropriately provided.

For example, when the display device 100 is composed as a television display device such as in this embodiment, the composition for accomplishing processing of audio output along with video is provided separately.

Next, the composition of the display assistance device 200 is explained with reference to FIGS. 4A to 4C and 5.

First, the explanation will be given with reference to FIGS. 4A and 4B which show the external composition of the display assistance device 200, and FIG. 4C which shows the internal composition of the display assistance device 200.

Figure 4A:
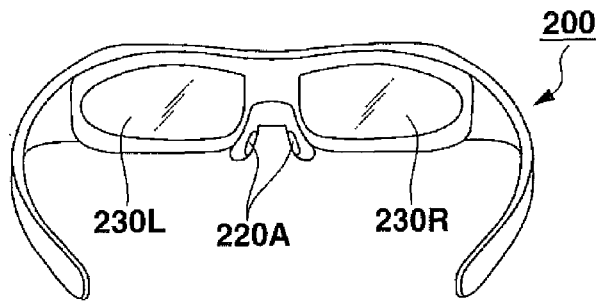
FIG. 4A shows an example of the external composition of the display assistance device shown in FIG. 1A as seen from the side touching the viewer.
Figure 4B:
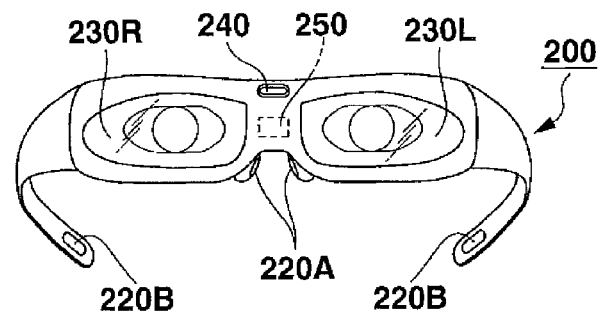
FIG. 4B shows an example of the external composition of the display assistance device shown in FIG. 1A as seen from the side facing the display device.

FIG. 4A schematically shows the external composition of the display assistance device 200 as viewed from the side in contact with the viewer, and FIG. 4B schematically shows the external composition of the display assistance device 200 as viewed from the side facing the display device 100.

Figure 4C:
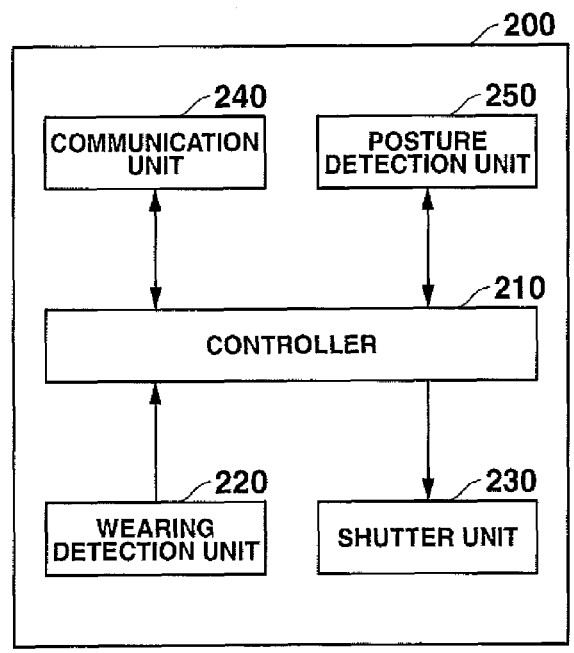
FIG. 4C is a block diagram showing the internal composition of the display assistance device shown In FIG. 1A.

In addition, FIG. 4C is a block diagram showing the internal composition of the display assistance device 200.

As shown in these figures, the display assistance device 200 according to this embodiment includes a controller 210, a wearing detection unit 220 (220A, 220B) (which constitutes a status detector), a shutter unit 230 (230L, 230R), a communication unit 240, a posture detection unit 250 (which constitutes a status detector) and/or the like.

The controller 210 includes for example a CPU or a memory device (main memory device and auxiliary memory device) and/or the like, generates various control signals by executing logical processes, and controls the various components of the display assistance device 200.

When the control target is an analog circuit, the signal is appropriately converted to an analog control signal by a DAC and/or the like.

This kind of controller 210 is comprised for example inside the frame in the glasses-shaped display assistance device 200.

The wearing detection unit 220 is comprised for example of contact sensors, detects that the display assistance device 200 has been put on by the viewer and transmits a signal indicating that this was detected to the controller 210.

In this embodiment, the wearing detection unit 220 is located at the position of the nose pad and the position of the temple of the display assistance device 200, for example as shown in FIGS. 4A and 4B, with the former being a wearing detection unit 220A and the latter being a wearing detection unit 220B.

The wearing detection unit 220A and the wearing detection unit 220B each comprise one wearing detection unit 220 set with two sensors.

The wearing detection unit 220 may function as a power source switch for the display assistance device 200.

In this case, the power source of the display assistance device 200 is turned on when the display assistance device 200 is worn by the viewer.

The power source that drives the various components of the display assistance device 200 may be composed of a battery (unrepresented) such as a button battery, for example, but when comprised to communicate via wires with the display device 100, for example, this may be comprised so that electric power is supplied from the display device 100.

The shutter unit 230 is such that the part corresponding to the lenses of the glasses includes a material such as liquid crystal, for example, that can control the transmission of light.

In this embodiment, this includes a so-called liquid crystal shutter using liquid crystal.

In this case, the transmission or non-transmission of light in the shutter unit 230 is controlled by controlling the voltage applied to the shutter unit 230.

In this embodiment, when the display assistance device 200 is worn by the viewer, the shutter unit 230 positioned at the left eye of the viewer is called the shutter unit 230L, and the shutter unit 230 positioned at the right eye of the viewer is called the shutter unit 230R.

In this embodiment, when the viewer is facing the screen of the display device 100, the eye on the right side facing the screen is the right eye, and the eye on the left side facing the screen is the left eye.

The communication unit 240 is a constitution to communicate with the display device 100, and comprises a communication device corresponding to the communication system utilized by the display device 100.

In this embodiment, because the communication unit 140 in the display device 100 utilizes infrared communication, the communication unit 240 includes a device that can accomplish infrared communication (that is to say, a composition similar to that of the communication unit 140).

The light transceiver of the communication unit 240 is composed at a position indicated by a reference number 240 in FIG. 4B, for example.

In other words, this is composed on the side facing the display device 100 when the display assistance device 200 is worn by the viewer.

The posture detection unit 250 detects the direction of the display assistance device 200 worn by the viewer, and for example includes a gravity sensor, a tilt sensor, a three-axis acceleration sensor, and/or the like.

For example, the posture detection unit 250 comprises a sensor that can detect whether the display assistance device 200 is horizontal or vertical with respect to the display screen of the display device 100, and furthermore can detect the angle of inclination with the horizontal direction or the vertical direction as a reference.

In this embodiment, the composition is such that the above-described inclination and angle can be detected on the basis of the gravitational direction, and a signal indicating the detected direction and angle is sent to the controller 210.

This kind of posture detection unit 250 is composed inside the frame (e.g., at the top of the nose pad) in the glasses-shaped display assistance device 200, for example.

The various processes according to the actions of the display assistance device 200 having the above-described composition are realized by the controller 210 executing programs.

The functions realized by the controller 210 will be explained with reference to FIG. 5.

Figure 5:
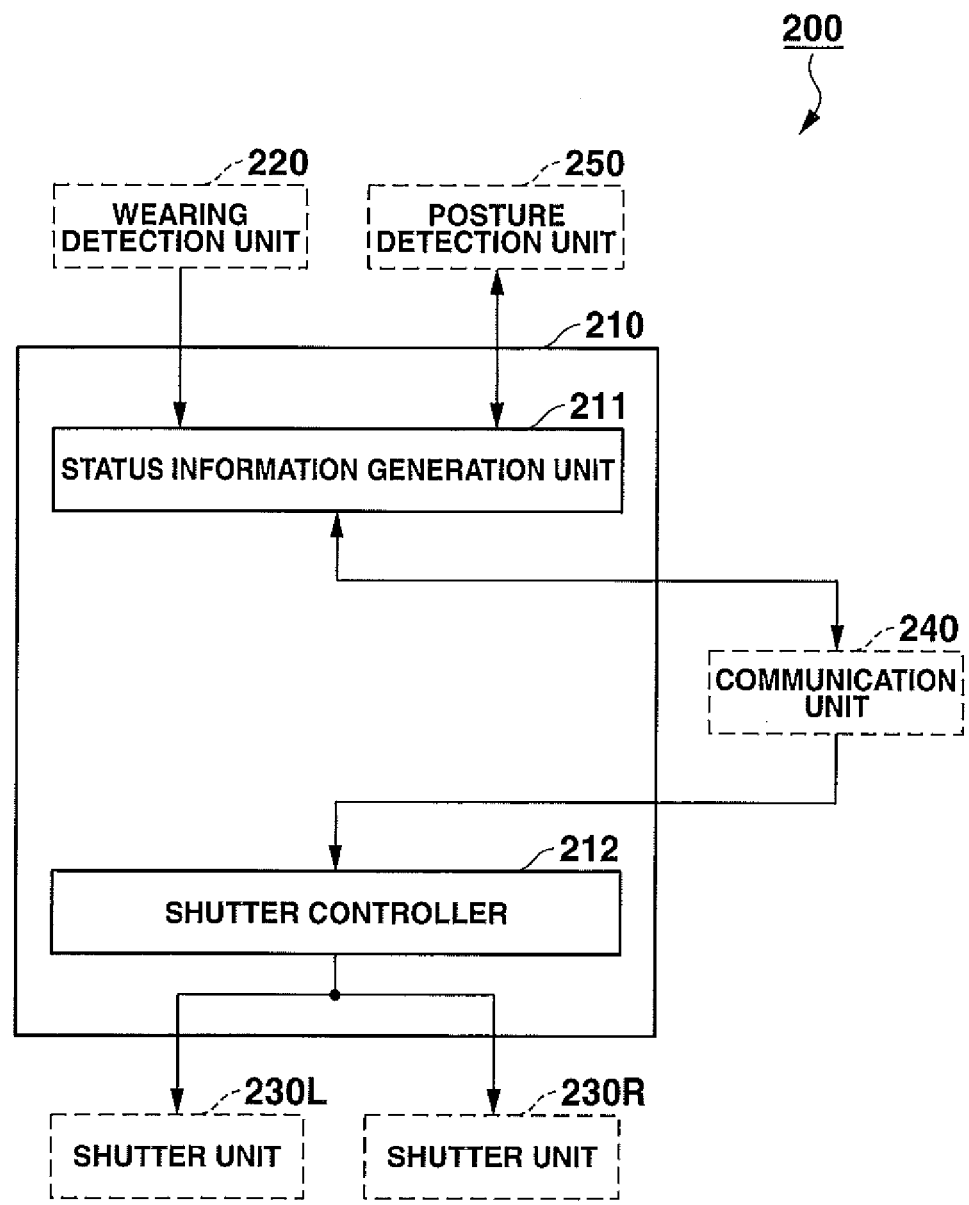
FIG. 5 is a function block diagram showing the functions realized by the controller shown in FIG. 4C.

FIG. 5 is a function block diagram showing functions realized by the controller 210.

As shown in the figure, the controller 210 functions as a status information generation unit 211, a shutter controller 212 and the like.

The status information generation unit 211 generates status information to send to the display device 100 via the communication unit 240.

The status information in this case is information indicating the status of the display assistance device 200, and includes detection results from the wearing detection unit 220 and the posture detection unit 250.

That is to say, when it is detected by the wearing detection unit 220 that the display assistance device 200 is being worn by the viewer, the status information generation unit 211 generates status information indicating this and sends this to the display device 100 via the communication unit 240.

In addition, the status information generation unit 211 causes a status detection action to be executed by controlling the status detection unit 250, generates status information indicating the detection results and sends this to the display device 100.

The shutter controller 212 controls the voltage impressed on the shutter unit 230L and the shutter unit 230R on the basis of the shutter synchronization signal received by the communication unit 240.

Through this, the shutter controller 212 accomplishes control so that the shutter unit 230L is in a transmissive state and the shutter unit 230R is in a non-transmissive state when the image for the left eye is displayed on the display device 100, and accomplishes control so that the shutter unit 230R is in a transmissive state and the shutter unit 230L is in a non-transmissive state when the image for the right eye is displayed on the display device 100.

In this embodiment, these functions are realized by a logical process through the controller 210, but some or all of the above-described functions may be realized by a hardware process such as an ASIC, for example.

The action of the display system 1 having the above composition will now be explained.

The "3D display process" accomplished through cooperation between the display device 100 and the display assistance device 200 will be explained with reference to the flowchart shown in FIG. 6.

This "3D display process" is started when, for example, the power source of the display assistance device 200 is turned on with the display device 100 in a started state.

That is to say, because the display assistance device 200 is a device used for 3D display (3D glasses), the power source of the display assistance device 200 is turned on and the device is worn by the viewer when the viewer wants to view a 3D display.

In this case, wearing by the viewer is detected by the wearing detection unit 220 (step S1001; Yes), and this fact is input to the controller 210.

In order for the viewer wearing the display assistance device 200 to recognize a 3D display, it is necessary for the alternating display of the binocular images in the display device 100 and the shutter action of the shutter unit 230 to be synchronized.

Accordingly, when the display assistance device 200 is worn by the viewer, the status information generation unit 211 generates status information indicating this fact and sends this to the display device 100 via the communication unit 240, and through this a synchronization request related to 3D display is accomplished (step S1002).

In the display device 100, when status information (wearing=3D display synchronization request) sent by the display assistance device 200 is received by the communication unit 140, that status information is input into the controller 110.

In this case, the status determination unit 111 determines that the status is to accomplish a 3D display and notifies the output image generation unit 112 and the display controller 113 of that fact.

Through this, binocular images for 3D display are acquired or generated by the output image generation unit 112, the display controller 113 alternately displays the binocular images on the display unit 130, a shutter synchronization signal is generated regarding this alternating display, and this shutter synchronization signal is sent from the communication unit 140 to the display assistance device 200 (step S1003).

In the display assistance device 200, when the communication unit 240 receives the shutter synchronization signal, this is input to the controller 210.

In this case, the shutter controller 212 accomplishes shutter action in synchronous with the alternating display on the display device 100 by controlling the voltage impressed on the shutter unit 230L and the shutter unit 230R on the basis of the shutter synchronization signal received (step S1004).

Here, the fact that the shutter synchronization signal was received is conveyed from the communication unit 240 to the status information generation unit 211.

The status information generation unit 211 determines it is a posture detection timing now with this notification (step S1005; Yes), and instructs the posture detection unit 250 to execute a posture detection action.

That is to say, the posture detection action is accomplished at the point in time when the 3D display using the display assistance device 200 is started.

In accordance with the instruction from the status information generation unit 211, the posture detection unit 250 accomplishes the posture detection action, and when the detection results are conveyed to the status information generation unit 211, the status information generation unit 211 generates status information indicating those detection results and sends these to the display device 100 via the communication unit 240 (step S1006).

In the display device 100, a "display control process" for accomplishing display control is executed on the basis of the status information (posture) sent from the display assistance device 200 (step S1100).

This "display control process" is explained with reference to the flowchart shown in FIG. 7.

Here, a display control for correcting the 3D display in accordance with the inclination of the display assistance device 200 with respect to the display device 100 is accomplished.

Prior to explaining the process contents, the inclination of the display assistance device 200 will be explained with reference to FIGS. 8A to 8C, 9A to 9C and 10A to 10C.

Figure 8A:
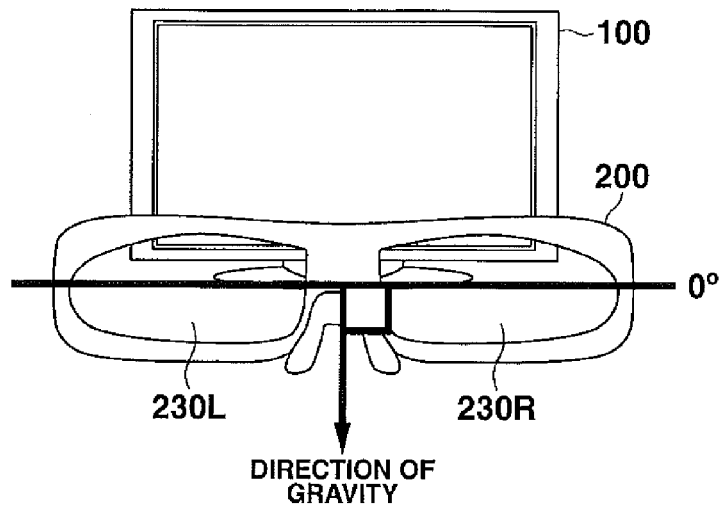
FIG. 8A is a drawing for explaining 0° as a reference for the posture of the display assistance device in the "display control process" shown in FIG. 7.

Because the display device 100 according to this embodiment is a television display device, the assumption is that the display device 100 is fixed in place so that the left-right direction (that is to say, the lengthwise direction) of the screen is in the horizontal direction, as shown in FIG. 8A.

In this case, because the normal viewing posture is that the viewer is viewing directly facing the display device 100, the status with the display assistance device 200 also such that the left-right direction is the horizontal direction is the norm, as shown in FIG. 8A.

Here, in the case in which the directly downward direction of the display assistance device 200 matches the gravitational direction, as shown in FIG. 8A, the direction perpendicular to that direction is taken as the horizontal direction of the display assistance device 200 and the direction is taken that it is in an angle of 0° as the norm.

The binocular images used in the 3D display have a shift in the left-right direction corresponding to parallax, and consequently it is desirable to be viewed in a direction such as that shown in FIG. 8A in order to be recognized as a 3D image, but it may be recognized (viewed) in a direction including a range of tolerance to a certain degree.

Figure 8B:
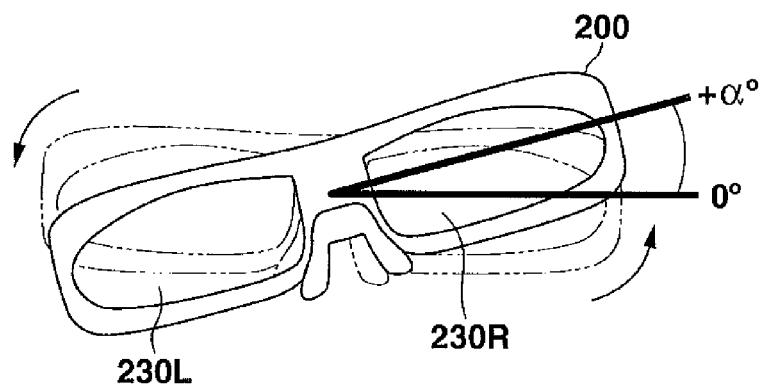
FIG. 8B is a drawing explaining an example of a normal viewing range referencing 0° as a reference for the posture of the display assistance device in the "display control process" shown in FIG. 7.
Figure 8C:
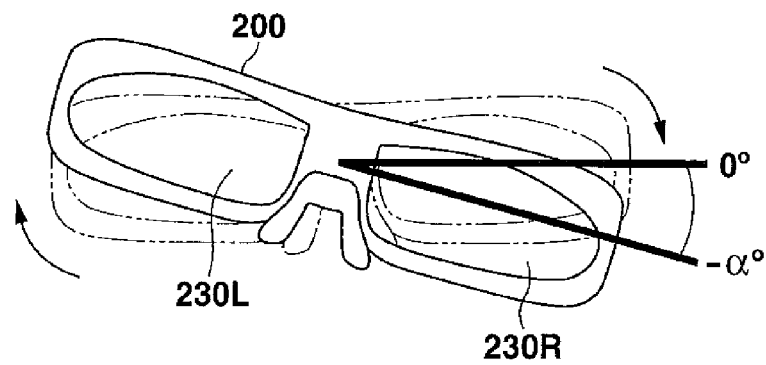
FIG. 8C is a drawing explaining an example of a normal viewing range referencing 0° as a reference for the posture of the display assistance device in the "display control process" shown in FIG. 7.

In this embodiment, the range of $\pm\alpha°$ from the 0° reference angle is taken as the range of tolerance, as shown in FIGS. 8B and 8C, and this range is called the "normal viewing range."

Here, $\alpha°$ is arbitrarily set through the performance of the display device 100 and the specifications of 3D display, and for example $\alpha°$ may equal around 15°.

In this manner, the posture detection unit 250 detects the inclination in the rolling direction of the display assistance device 200 with respect to the display device 100.

In a conventional 3D display system, if the posture is other than a posture in the normal viewing range on the basis of this horizontal direction, the 3D display cannot be recognized correctly, so there is no degree of freedom in the posture of the viewer.

With the present invention, through a below-described process the normal viewing range can be achieved even if the viewer has a sideways posture, for example.

Here, the direction of the display assistance device 200 supposing a case in which the viewer is sideways is explained with reference to FIGS. 9A to 9C and FIGS. 10A to 10C.

Figure 9A:
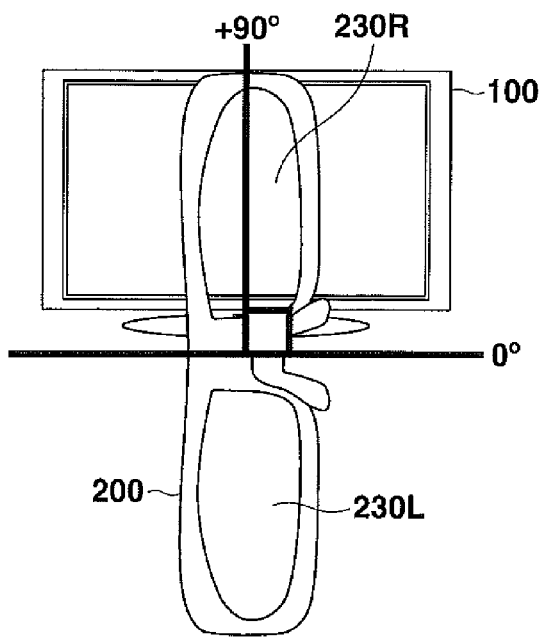
FIG. 9A is a drawing for explaining +90° as a reference for the posture of the display assistance device in the "display control process" shown in FIG. 7.
Figure 9B:
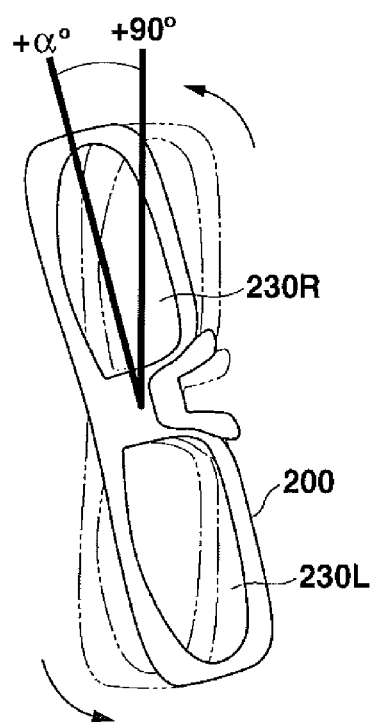
FIG. 9B is a drawing explaining an example of a normal viewing range referencing +90° as a reference for the posture of the display assistance device in the "display control process" shown in FIG. 7.
Figure 9C:
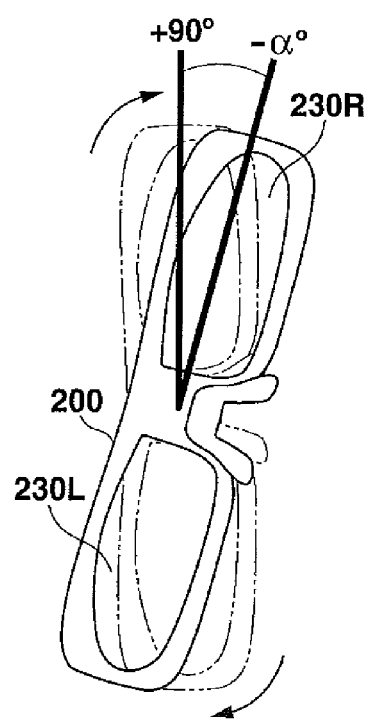
FIG. 9C is a drawing explaining an example of a normal viewing range referencing +90° as a reference for the posture of the display assistance device in the "display control process" shown in FIG. 7.

The example shown in FIGS. 9A to 9C supposes a sideways case in which the left side of the head of the viewer is down.

In this case, taking the direction inclined 90° (+90° in the counterclockwise direction from the reference angle 0° as a reference, as shown in FIG. 9A, the range of $\pm\alpha°$ from this +90° is taken as the normal viewing range, as shown in FIGS. 9B and 9C.

Figure 10A:
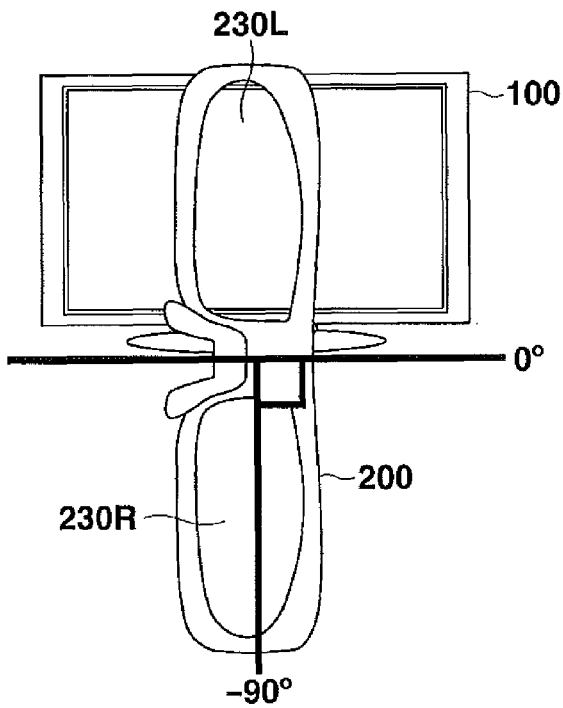
FIG. 10A is a drawing for explaining −90° as a reference for the posture of the display assistance device in the "display control process" shown in FIG. 7.
Figure 10B:
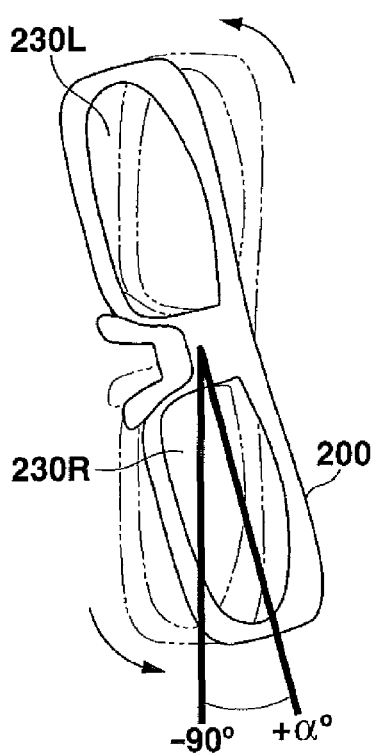
FIG. 10B is a drawing explaining an example of a normal viewing range referencing −90° as a reference for the posture of the display assistance device in the "display control process" shown in FIG. 7.
Figure 10C:
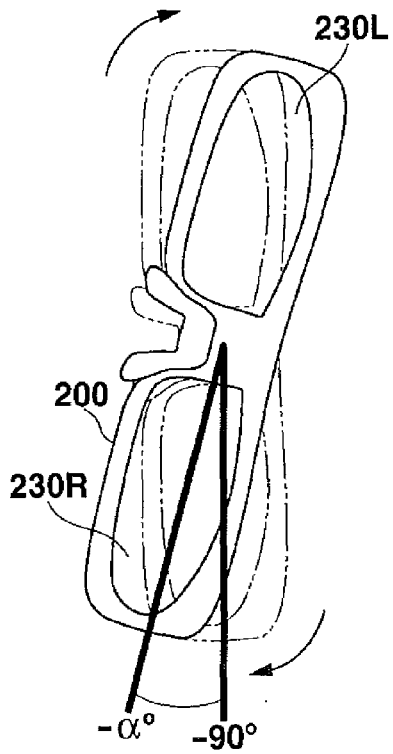
FIG. 10C is a drawing explaining an example of a normal viewing range referencing −90° as a reference for the posture of the display assistance device in the "display control process" shown in FIG. 7.

On the other hand, an example of a sideways case in which the right side of the head of the viewer is down is shown in FIGS. 10A to 10C. In this case, taking the direction inclined) 90° (−90° in the clockwise direction from the reference angle 0° as a reference, as shown in FIG. 10A, the range of $\pm\alpha°$ from this −90° is taken as the normal viewing range, as shown in FIGS. 10B and 10C.

Assuming the above kind of angle settings, the "display control process" shown in FIG. 7 is explained below.

In a display device 100 that has received status information indicating the detected posture of the display assistance device 200, the status determination unit 111 determines whether or not the display assistance device 200 is in the above-described normal viewing range, on the basis of the angle of the display assistance device 200 indicated by the status information.

In FIG. 7, the explanation is simplified using determination blocks, but in reality, determinations are not made on whether or not the device is inclined at an instant, but whether or not inclination has continued for a predetermined time (e.g., 5 seconds) (whether or not this has stabilized within the normal viewing range).

Figure 11A:
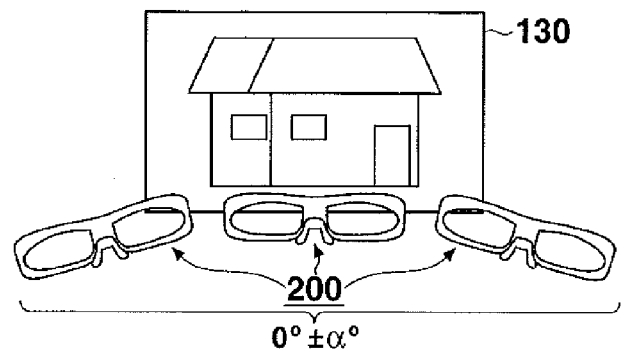
FIG. 11A is a drawing showing a display example of the display unit when the posture of the display assistance device is $0°±α°$ in the action in the "display control process" shown in FIG. 7.

Here, when the status of the display assistance device 200 is the normal viewing range with the horizontal direction as the reference (that is to say, when the angle of the display assistance device 200 is "0°±α°") as shown in FIGS. 8A to 8C (step S1101: Yes), an image like that shown in FIG. 11A (here, the image of a house) can be recognized correctly as 3D display, if the image is displayed as a normal 3D display, that is to say as a 3D display in which the binocular images shifted in the horizontal direction are displayed.

Accordingly, the status determination unit 111 instructs the output image generation unit 112 and the display controller 113 so as to make this kind of display (3D upright display) (step S1102).

That is to say, if the image acquired by the image acquisition unit 120 is a 3D image, the output image generation unit 112 acquires this as binocular images without change and the display controller 113 alternately displays these binocular images on the display unit 130.

Furthermore, the display controller 113 generates a shutter synchronization signal in accordance with that display and sends this to the display assistance device 200 (step S1103).

Figure 11B:
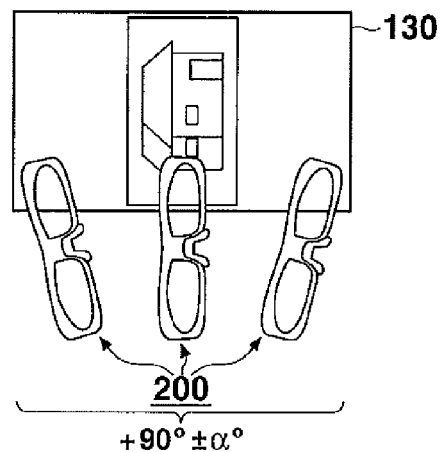
FIG. 11B is a drawing showing a display example of the display unit when the posture of the display assistance device is $+90°±α°$ in the action in the "display control process" shown in FIG. 7.

On the other hand, when the status of the display assistance device 200 is a normal viewing range where the left side of the head of the viewer is down (that is to say, the angle of the display assistance device 200 is "+90°±α") as shown in FIGS. 9A to 9C (step S1101: No; step S1104: Yes), the status determination unit 111 instructs the output image generation unit 112 and the display controller 113 so that the display image is rotated to the left 90°, as shown in FIG. 11B.

That is to say, because the posture is such that the left side of the head of the viewer is down, the display image is rotated to the left 90° in conjunction therewith.

In this case, the output generation unit 112 causes each of the binocular images acquired to rotate to the left 90° (step S1105).

The binocular images in this case are shifted in the vertical direction on the screen of the display device 100.

Moving images such as television images are in a landscape format, so it is impossible to display the entire image when this image is rotated 90°.

Hence, the output image generation unit 112 adjusts the image size so that the size of the image in the lengthwise direction fits in the vertical direction of the display screen, as shown in FIG. 11B (step S1106).

The display controller 113 alternately displays the binocular images processed in this manner by the output image generation unit 112 on the display unit 130, and also generates a shutter synchronization signal based on this alternating display and sends such to the display assistance device 200 (step S1103).

Figure 11C:
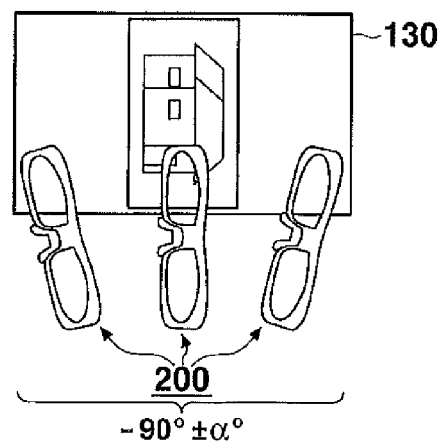
FIG. 11C is a drawing showing a display example of the display unit when the posture of the display assistance device is $−90°±α°$ in the action in the "display control process" shown in FIG. 7.

On the other hand, when the status of the display assistance device 200 is a normal viewing range where the right side of the head of the viewer is down (that is to say, the angle of the display assistance device 200 is "−90°±α°") as shown in FIGS. 10A to 10C (step S1101: No; step S1104: No; step S1107: Yes), the status determination unit 111 instructs the output image generation unit 112 and the display controller 113 so that the display image is rotated to the right 90°, as shown in FIG. 11C.

That is to say, because the posture is such that the right side of the head of the viewer is down, the display image is rotated to the right 90° in conjunction therewith.

In this case, the output generation unit 112 causes each of the binocular images acquired to rotate to the right 90° (step S1108).

The binocular images in this case are shifted in the vertical direction on the screen of the display device 100.

In this case also, the output image generation unit 112 adjusts the image size so that the size of the image in the lengthwise direction fits in the vertical direction of the display screen, as shown in FIG. 11C (step S1106).

The display controller 113 alternately displays the binocular images processed in this manner by the output image generation unit 112 on the display unit 130, and also generates a shutter synchronization signal based on this alternating display and sends such to the display assistance device 200 (step S1103).

In the case of the three normal viewing ranges assumed in this embodiment as described above, the display direction and size of the image are controlled so that a 3D display is correctly recognized in that posture.

When viewing with a posture that is not in this kind of normal viewing range, the parallax direction in the 3D image and the parallax direction of the viewer diverge, so not only is the image not recognized correctly as a 3D image, but by viewing an unnaturally shifted image, there are concerns that negative physiological effects could occur, such as visual strain or eyestrain.

Hence, in this embodiment, when the viewer has this kind of posture, an action is accomplished to mitigate negative physiological effects.

That is to say, in a case that is not any of the three above-described normal viewing ranges (step S1101: No; step S1104: No; step S1107: No), the status determination unit 111 determines whether or not the display assistance device 200 is even now being worn by the viewer (step S1109).

In the display assistance device 200, when the wearing detection unit 220 detects a change in the wearing status, that fact is conveyed to the controller 210 by an interruption process.

In this case, the status information generation unit 211 generates status information that the wearing status has changed and sends such to the display device 100.

That is to say, when the viewer has taken off the display assistance device 200, resulting in the orientation of the display assistance device 200 no longer being a normal viewing range, status information indicating that the device has been taken off is sent from the display assistance device 200, and consequently on the basis of this the status determination unit 111 can determine whether or not the wearing status is continuing.

When the posture is outside the normal viewing range with the display assistance device 200 in a status being worn by the viewer (step S1109: Yes), the status determination unit 111 instructs the output image generation unit 112 and the display controller 113 to display a warning alert screen.

In this case, the output image generation unit 112 generates a warning alert screen indicating a message through text, for example, and the display controller 113 displays the warning alert screen (information) so as to overlay the image currently displayed.

Figure 12A:
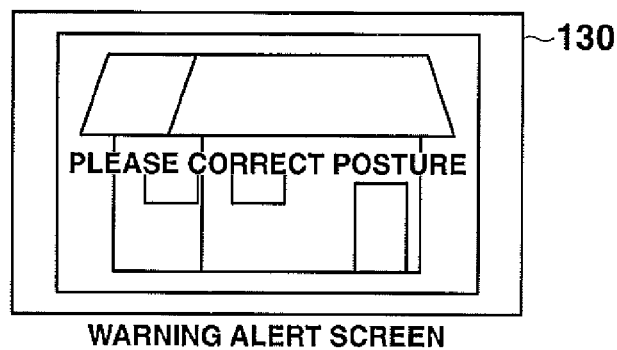
FIG. 12A is a drawing showing a display example of a warning alert screen in the "display control process" shown in FIG. 7.

Accordingly, a warning alert screen such as that shown in FIG. 12A is displayed on the display unit 130 (step S1110).

In this case, the output image generation unit 112 displays on the display unit 130 a message prompting the viewer to assume a proper posture.

In this case, the warning alert image may be displayed as a 2D image so that the viewer can readily confirm such.

In addition, the output image generation unit 112 is not limited to displaying the warning alert image overlaid, but may also display only the warning alert image.

Here, the status determination unit 111 simultaneously generates an instruction signal (posture information request) instructing that further status information indicating the posture of the display assistance device 200 be provided, and sends this to the display assistance device 200 via the communication unit 140 (step S1110).

In the display assistance device 200, in response to the posture information request sent from the display device 100, the status information generation unit 211 causes the current inclination angle of the display assistance device 200 to be detected by controlling the posture detection unit 250, generates status information indicating the detection results and replies with this to the display device 100 (step S1006 (FIG. 6)).

In the display device 100, when status information sent in reply from the display assistance device 200 is received, the status determination unit 111 accomplishes the same determination as in above-described steps S1101, S1104 and S1107, and through this determines whether or not the orientation of the display assistance device 200 is still not a normal viewing range (step S1111).

When the orientation of the display assistance device 200 is still outside the normal viewing ranges (step S1111: Yes), no change in viewing posture has resulted despite displaying the warning alert screen.

In this case, because there are concerns that negative physiological effects could result if a 3D image is viewed in this state, the status determination unit 111 instructs the output image generation unit 112 and the display controller 113 to halt the 3D display and to make a 2D display.

In this case, the output image generation unit 112 generates an output image using only one of the binocular images when the image acquired by the image acquisition unit 120 is a 3D image.

In addition, when the image acquired by the image acquisition unit 120 is a 2D image, because the 3D display is accomplished to this point through a 2D/3D conversion by the output image generation unit 112, the output image generation unit 112 stops this 2D/3D conversion.

In this case, in step S1112, the explanation was of a 2D image displayed upright, but it would also be fine for the status determination unit 111 to determine which range out of the normal viewing ranges of $0°±α°$, $+90°±α°$ and $−90°±α°$ this is close to, even if outside the normal viewing ranges, and for the display controller 113 to cause a display by rotating the 2D image so as to be compatible with the closest normal viewing range.

In other words, when the viewer is viewing for example in a posture of $+90°±α+β$ ($α=15°$, $β=5°$), the display controller 113 may display the 3D image in a state rotated 90° to the left. (When $0°±α°$ is closest, this is the same as the upright display of step S1112).

The display controller 113 displays the 2D image generated in this manner on the display unit 130 as it is without alternating displays.

Here, because the display assistance device 200 is in a state being worn by the viewer, the display controller 113 generates a shutter synchronization signal as a shutter action corresponding to 2D display and sends such to the display assistance device 200.

In this case, a shutter synchronization signal that causes both the shutter unit 230L and the shutter unit 230 R to assume a transmissive state is generated.

Figure 12B:
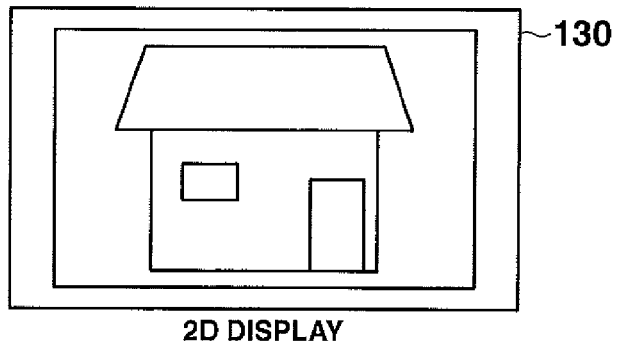
FIG. 12B is a drawing showing a display example of a 2D display in the "display control process" shown in FIG. 7.

In the display assistance device 200, the viewer is caused to see a 2D display such as that shown in FIG. 12B by accomplishing the shutter action based on this kind of shutter synchronization signal.

In this case, it is outside the normal viewing ranges, so control is not exercised regarding the direction of the display image.

That is to say, the displayed image is a normal upright display as shown in FIG. 12B (step S1112).

Because this kind of 2D display is an action of not displaying one of the binocular images according to a 3D display, in other words the effect of the 3D display is reduced.

When a normal viewing range is achieved after displaying the warning alert screen (step S1111: No), display control in accordance with this normal viewing range is accomplished by accomplishing the processes from step S1101 on.

On the other hand, when the display assistance device 200 is removed from the viewer and is outside the normal viewing ranges (when it is determined that this has been removed from the viewer) (step S1109: No), viewing as a 3D display is not accomplished, so the status determination unit 111 instructs the output image generation unit 112 and the display controller 113 so as to make a 2D display rather than a 3D display.

In this case, similar to the above-described case, the output image generation unit 112 generates an image for 2D display, and the display controller 113 displays this 2D display on the display unit 130 as-is without accomplishing alternating displays.

Because the display assistance device 200 is not being worn by the viewer, the display controller 113 halts the generation and sending of shutter synchronization signals.

When the display assistance device 200 is not being worn, the posture of the viewer is unknown, so in this case also, control is not exercised regarding the direction of the display image.

That is to say, the image displayed is a normal upright display, as shown in FIG. 12B (step S1112).

When display control is accomplished in accordance with the direction (inclination) of the display assistance device 200 in accordance with the posture of the viewer through the above processes and shutter synchronization signals corresponding thereto are sent to the display assistance device 200, the flow returns to that of the 3D display process shown in FIG. 6.

In a display assistance device 200 in which shutter actions are accomplished on the basis of shutter synchronization signals sent from the display device 100 through the above-described "display control process," the processes in steps S1004 to S1006 are repeatedly accomplished (step S1007: No) until a prescribed end event (for example, the power source of the display assistance device 200 being turned off) occurs.

The posture detection timing determined in step S1005 for example periodically occurs with a set time interval.

Furthermore, the display device 100 accomplishes display control in accordance with the posture (inclination) of the display assistance device 200 detected at those times, and a shutter action is accomplished on the basis of the shutter synchronization signal in that case.

That is to say, even if the posture of the viewer changes, if the posture is within a normal viewing range, display control is accomplished so that a 3D display is correctly recognized (viewed) in that posture.

In addition, when the posture is outside the normal viewing ranges, the display device 100 displays a screen promoting correction of the posture, and when the posture is not corrected even then, makes a 2D display so as to prevent the occurrence of negative physiological effects.

Furthermore, when an end event occurs in the display assistance device 200 (step S1007: Yes), the status information generation unit 211 generates status information indicating that fact and sends this to the display device 100, ending the process.

The display device 100 having received status information indicating the end ends the 3D display (step S1008) and ends the process.

That is to say, if the power source of the display assistance device is turned off, because this makes it so viewing of the 3D display is impossible, the display device 100 ends the 3D display and switches to a 2D display by accomplishing an action similar to the above-described action.

In addition, the case of the display assistance device 200 being taken off the viewer also becomes an end event with timing in which the above-described "display control process" is not executed, and the 3D display is similarly ended.

As explained above, with this embodiment, even when a display is viewed with a posture other than the viewing posture originally recommended, display control is accomplished so that this can be seen as a 3D display, thereby making it possible to increase the degree of freedom in viewing posture.

In addition, in the case of a posture in which the display cannot be correctly viewed as a 3D display, the display system provides a warning to take the correct posture, making it possible to prevent or mitigate negative physiological effects.

In this case, when the posture is not corrected even after this warning is given, the display system does not accomplish a 3D display, making it possible to prevent or mitigate negative physiological effects, more effectively.

In this embodiment, correction of the posture was promoted by displaying a warning alert screen such as that shown in FIG. 12A, but the warning alert method is not limited to this.

For example, a warning alert may be made by audio, or in place of displaying a message, a warning alert may be made by having a display condition differing from normal, for example causing the screen to blink.

When a warning alert is made by audio, a composition may be provided for outputting audio to the display assistance device 200, and an audio warning alert may be generated from the display assistance device 200 side.

In addition, a warning alert may be made by causing both the left and right shutters 230L and 230R on the display assistance device side to close and become dark.

Or, an action may be taken such as extinguishing the display itself or showing a black screen.

In this embodiment, the explanation given was for promoting correction of the posture by displaying "please correct your posture" as shown in FIG. 12A as the warning alert message, but it would also be fine to promote 2D image viewing by displaying "please remove the special glasses."

Furthermore, when the special glasses (display assistance device 200) are removed through a display promoting 2D image viewing, in a display system provided with a wearing detection function such as in this embodiment, a 2D display is displayed.

In addition, in this embodiment when the posture is outside the normal viewing ranges, if the posture is not corrected or the 3D glasses (display assistance device 200) are not removed even after a warning alert is made, a change is made from the 3D display to a 2D display (the effects of the 3D display are mitigated), but this is not limited to this example as long as negative physiological effects can be mitigated.

Figure 12C:
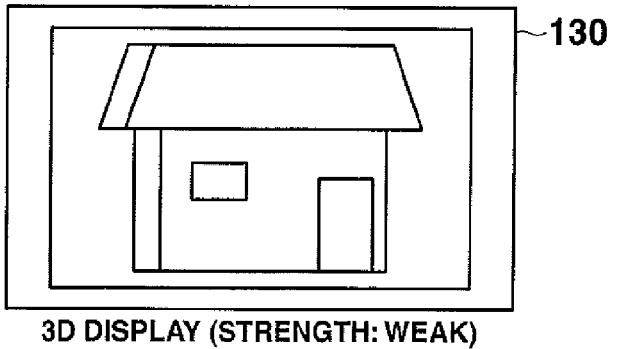
FIG. 12C is a drawing showing a display example in which the effects of a 3D display are reduced (weaken) in the "display control process" shown in FIG. 7.

For example, as shown in FIG. 12C, a 3D display that reduces (weakens) the effect (strength) can be continued by reducing (weakening) the shift amount of the binocular images so as to be visible to a degree that visual strain and eyestrain do not occur.

(Embodiment 2)

In Embodiment 1 above, the status of the display assistance device 200 is determined on the display device 100 side and display control accomplished on the basis of the results of posture detection in the display assistance device 200, but the composition may be such that status determination accomplished by the display device 100 is accomplished by the display assistance device 200.

In this case, the basic compositions of the display device 100 and the display assistance device 200 are the same as in the case of Embodiment 1, but the functions realized by the controller 210 of the display assistance device 200 are for example as shown in FIG. 13.

That is to say, besides the status information generation unit 211 and the shutter controller 212 shown in Embodiment 1 (FIG. 5), a function as a status determination unit 213 is added to the display assistance device 200.

This status determination unit 213 has a function corresponding to the status determination unit 111 illustrated by example in Embodiment 1.

In addition, the status information generation unit 211 shown in Embodiment 1 in this embodiment becomes a status information/alternating synchronization signal generation unit 214 (explained in detail below).

In a display assistance device 200 having this composition, the status determination unit 213 determines the status of the display assistance device 200 on the basis of the detection results of the posture detection unit 250.

That is to say, in the "display control process" (FIG. 7) of Embodiment 1, the determination accomplished by the status determination unit 111 in steps S1101, S1104 and S1107 is accomplished by the status determination unit 213.

In other words, in the display assistance device 200, a determination is made as to whether or not the orientation (inclination) of the display assistance device 200 corresponds to any of "$0°\pm\alpha°$", "$+90°\pm\alpha°$" or "$-90°\pm\alpha°$", and when the orientation corresponds thereto, the status information/alternating synchronization signal generation unit 214 generates information instructing the corresponding display control as the status information and sends this to the display device 100.

In addition, the status information/alternating synchronization signal generation unit 214 besides status information generates an alternating synchronization signal L/R in order to cause the left and right images on the display device side to be alternately displayed in synchronous with the control of the left and right shutters 230L and 230R of the display assistance device 200 as the above-described information instructing display control, and sends this from the display assistance device 200 side.

That is to say, from the display assistance device 200 side instruction information to for example "cause the display screen to rotate to the left 90°, adjust the size of the image and cause the display to alternately switch left and right images in synchronous with the alternating synchronization signal L/R signal" is sent to the display device 100, and in the display device 100 display control is accomplished on the basis of the instruction information from the display assistance device 200.

In this case, the clock that is the basis for the alternating period (for example 1/120 of a second) of the time division display is created by the display assistance device 200 side, and based on this clock, the alternating synchronization signal L/R that is paired with the control signals of the left and right shutters 230L and 230R may be generated by the display assistance device 200 side.

The display device 100 receives the alternating synchronization signal L/R along with the status information, and on the basis of such accomplishes display control according to the 3D display, specifically rotating the display in accordance with the status information (inclination) and displaying left and right images after accomplishing timing adjustment (lag control) of left and right images alternating in accordance with the alternating synchronization signal L/R.

In other words, in Embodiment 1 the left and right shutters 230L and 230R of the display assistance device 200 are controlled on the basis of a synchronization signal from the display device 100 the same as in conventional time division 3D display systems, but in Embodiment 2, the left and right shutters 230L and 230R of the display assistance device 200 are independently alternated on the display assistance device 200 side, and in exchange, the display assistance device 200 controls the display device 100 so that the left and right images that are to be synchronized with the synchronization signal are displayed with the appropriate timing on the display device 100 side (sends signals to that end).

In the display assistance device 200, it is necessary to send status information to the display device 100 in Embodiment 2 the same as in Embodiment 1, but in Embodiment 2, the display assistance device 200 side accomplishes this kind of principal control, and through this it is not necessary to receive a signal from the display device 100 to synchronize the shutter action of the display assistance device 200.

Hence, it is possible to not endow the communication unit 240 of the display assistance device 200 with a receiving function, making it possible to simplify the composition.

In the display device 100, it is necessary to receive status information from the display assistance device 200 even in Embodiment 2, the same as in Embodiment 1, but in Embodiment 2, the display assistance device 200 side accomplishes this kind of principal control and through this it is not necessary to generate and send signals for synchronizing the shutter action of the display assistance device 200.

Hence, unlike in the case of Embodiment 1, it is possible to not endow the communication unit 140 of the display device 100 endowed with a sending function, making it possible to simplify the composition.

In addition, when the controller 210 of the display assistance device 200 is given sufficient processing capabilities in this manner, it is possible to also reduce time lag of display control with respect to posture changes of the viewer by accomplishing the action of determining the status of the display assistance device 200 and the action of generating an alternating synchronization signal on the display assistance device 200 side.

With display control as illustrated by example in Embodiment 1 and Embodiment 2, when the orientation (inclination) of the display assistance device 200 is "+90°±α°" or "−90°±α°" on the basis of the posture of the viewer, the display size of the image is adjusted after causing the display image to be rotated 90°, but for example when posture changes are made frequently, there is a possibility that viewing could become difficult due to frequent changes in image size also.

Figure 14A:
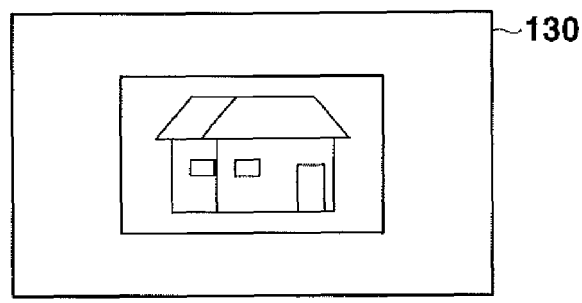
FIG. 14A shows an example of a display when an upright display is made with an image size shrunken in advance.
Figure 14B:
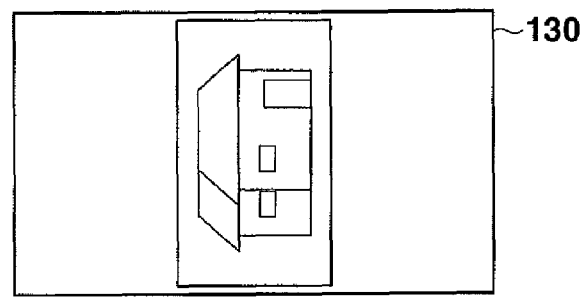
FIG. 14B shows an example of a display when the image of FIG. 14A is displayed rotated +90°.
Figure 14C:
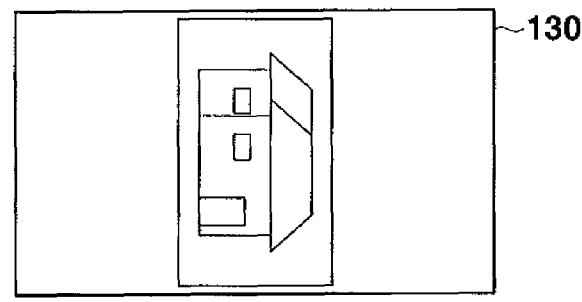
FIG. 14C shows an example of a display when the image of FIG. 14A is displayed rotated −90°.

Hence, as shown in FIG. 14A, after adjusting in advance the image size to fit the screen when rotated ±90° as shown in FIG. 14B or 14C, that fit image may be displayed during upright displays also.

Through this, even if posture changes are made frequently, it is possible to make only the display direction match the posture without creating changes in image size, so it is possible to make a display that is easier to view.

This kind of action may be accomplished on the basis of the frequency of posture changes, for example.

For example, a threshold value for the number of posture changes in a given time may be set, and when posture changes occur with a frequency that exceeds this, subsequent displays may be set to a post-adjustment image size (a smaller size), and if the frequency does not exceed the threshold value, the action may be to adjust the image size whenever the image direction changes, as illustrated by example in Embodiment 1.

In addition, in order to prevent viewing difficulties when rotation of the image (and the rendering of 3D based on this) is accomplished frequently in the above-described embodiments, it is fine to have a hysteresis property in the angle determination.

(Variation on Embodiment 2)

In Embodiment 2, the status determination was made by the display assistance device 200, but the display assistance device 200 may send the status information itself and the status determination may be made by the display device 100 side, similar to Embodiment 1.

In this case, the difference from Embodiment 1 is that the alternating synchronization signal L/R is generated by the display assistance device 200.

(Embodiment 3)

In the above-described embodiments, the explanation was for the example of a case in which the display device 100 was a television display device.

Because the display device according to the present invention can be applied to all display devices, this is not limited to television display devices.

In the case of television display devices, the direction of the image displayed is fixed, so changing the direction of the screen itself is not envisioned, but for example when the present invention is applied to a digital photo frame, the photo has a horizontal position and a vertical position, so it is conceivable that the direction of the screen itself could change in accordance with this.

Figure 15A:
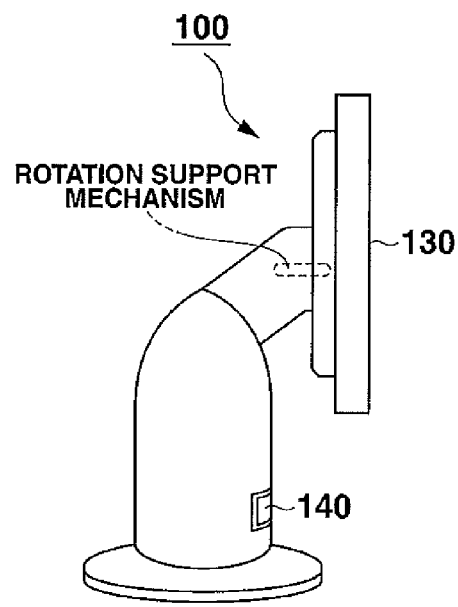
FIG. 15A shows the external composition of a display device according to a third embodiment of the present invention.

In this case, for example by using a commonly known rotation support mechanism for example as shown in FIG. 15A, it is possible to comprise a display device 100 that can rotatably support the display unit 130.

Figure 15B:
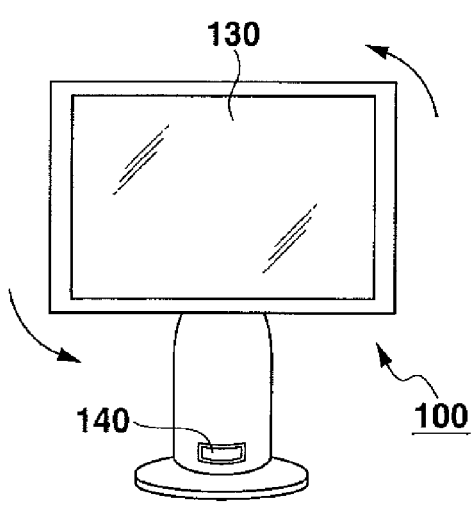
FIG. 15B schematically shows a state when the display unit of the display device according to the third embodiment of the present invention is rotated.
Figure 15C:
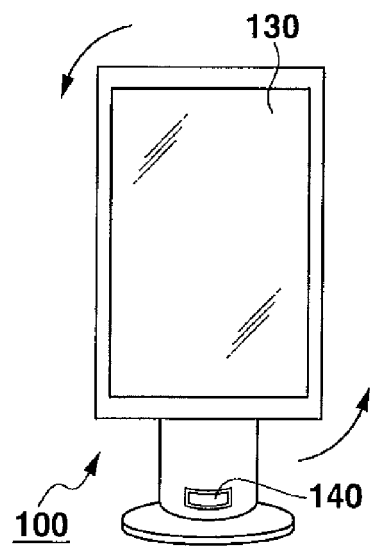
FIG. 15C schematically shows a state when the display unit of the display device according to the third embodiment of the present invention is rotated.

In this kind of display device 100, it is possible to rotate the display unit 130 in accordance with the display contents and to give this a portrait orientation or a landscape orientation, as shown in FIGS. 15B and 15C.

For example, when a photo shot in a sideways position is displayed, using the landscape orientation such as in FIG. 15B can maximize the display of the image, and when a photo shot in a vertical position is displayed, using the portrait orientation such as in FIG. 15C can maximize the display of the image.

Here, a structure such that a display unit (frame unit) connected to a pedestal part that is a leg rotates, such as shown in FIGS. 15A to 15C, is explained as a digital photo frame, but this may also be a structure without a pedestal part and with only the display unit (frame unit), and that can be rotated up and down, left and right depending on placement.

When a display device 100 is composed as a digital photo frame whose primary purpose is this kind of photo display, a display control differing from the display control illustrated by example in the above-described embodiments can be accomplished.

An example of this case will be explained with reference to FIGS. 16A and 16B.

Here, an image of an airplane as shown in the drawing is displayed on the display unit 130.

Figure 16A:
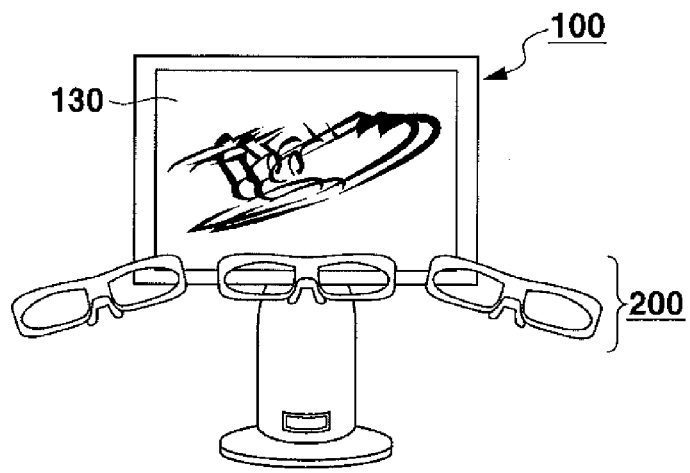
FIG. 16A schematically shows an example of a display on the display unit when the posture of the display assistance device is changed without rotating the display unit.
Figure 16B:
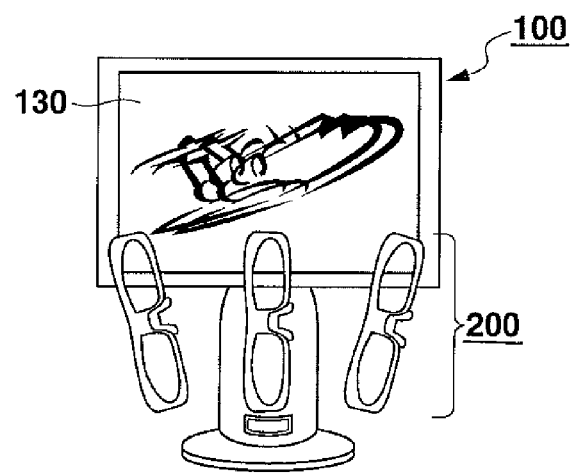
FIG. 16B schematically shows an example of a display on the display unit when the posture of the display assistance device is changed without rotating the display unit.

For example, when the display unit 130 of the display device 100 is in landscape orientation and the posture of the display assistance device 200 is "0°±α°", as shown in FIG. 16A, the posture of the display assistance device 200 becomes "+90°±α°" or "−90°±α°" (omitted from drawing), as shown in FIG. 16B.

In the display control of the above-described embodiment, in this kind of case a process that causes the display image to rotate 90° is accomplished.

This is because the supposition is that the envisioned image is a dynamic image and is a landscape image in landscape format.

When a photo is displayed on the digital photo frame, there are cases when regardless of the viewing direction it is preferable to display the image enlarged, for example when viewing in more detail.

Hence, even when the display assistance device 200 is "+90°±α°" or "−90°±α°", it is fine to not cause the image to rotate, as shown in FIG. 16B.

However, in this case in order to be viewed as a 3D display, it is necessary for binocular images corresponding to the left-right direction of the viewer to be displayed.

Hence, the output image generation unit 112 and the display controller 113 display binocular images such that the binocular images are shifted in the vertical direction of the display unit 130, as shown in FIG. 16B.

In this case, when the image acquired by the image acquisition unit 120 is a 3D image, the output image generation unit 112 acquires only one of the binocular images that comprises this 3D image, and by accomplishing a 2D/3D conversion on the acquired monocular image, generates binocular images shifted in the vertical direction in the display unit 130.

In addition, in the display device 100 having the composition shown in FIG. 15A, by providing the same composition as the posture detection unit 250 in the display assistance device 200 illustrated by example in the above-described embodiments, it is possible to detect the orientation of the display unit 130.

Furthermore, in the process corresponding to the above-described "display control process", by accomplishing control taking into consideration not just the posture (orientation) of the display assistance device 200 but also the orientation of the display unit 130, it is possible to realize more multi-purpose display control.

Figure 17A:
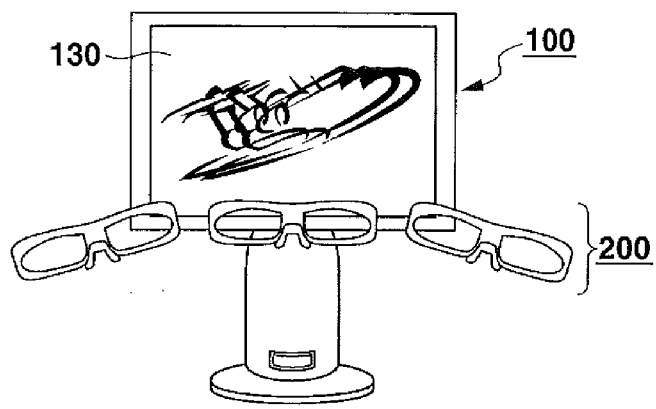
FIG. 17A shows an example of a display when the display unit is in the landscape orientation and the posture of the display assistance device is $0°±α'$.
Figure 17B:
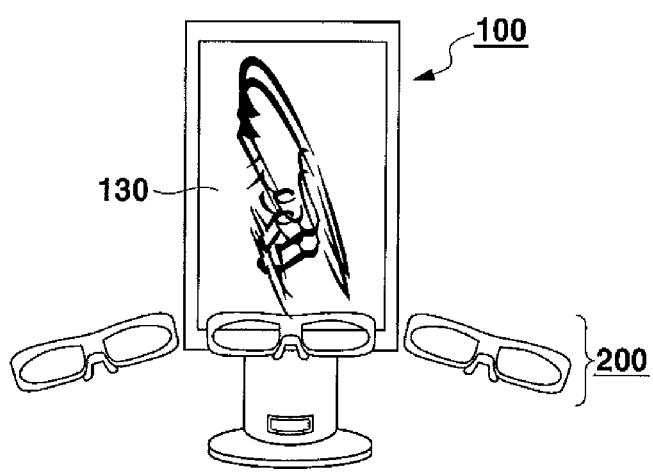
FIG. 17B schematically shows an example of a display on the display unit when the display unit is rotated from the state shown in FIG. 17A without the posture of the display assistance device changing.

For example, from the status in which the display unit 130 is in a landscape orientation and the posture of the display assistance device 200 is "0°±α°", as shown in FIG. 17A, the display unit is rotated 90°, as shown in FIG. 17B.

At this time, the posture of the display assistance device 200 remains at "0°±α°".

Furthermore, in order to maximally enlarge the display of the photo, the display orientation of the image is caused to maintain a corresponding relationship to the length and width of the display unit 130, as shown in FIG. 17B.

Here, when the posture of the display assistance device 200 does not change, it is necessary to change the direction of shift of the binocular images displayed.

Hence, the output image generation unit 112 generates a 3D image such that the binocular images are shifted in the left-right direction of the display assistance device 200, as shown in FIG. 17B.

Figure 17C:
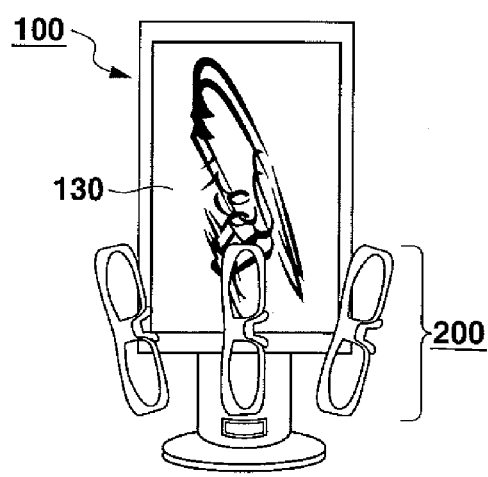
FIG. 17C shows an example of a display on the display unit when the posture of the display assistance device is changed from the state shown in FIG. 17B.

In this status, when the posture of the display assistance device 200 becomes "+90°±α°" or "−90°±α°" (omitted from the drawing) as shown in FIG. 17C, the output image generation unit 112 generates a 3D image with the binocular images shifted in the left-right direction of the display assistance device 200.

In this manner, it is possible to change the screen orientation in a display device such as a digital photo frame, and by using not just the posture (orientation) of the display assistance device 200 but also the screen orientation as a factor, more multi-purpose display control can be accomplished.

In this case as well, when the relative relationship between the screen direction and the posture of the display assistance device 200 causes negative physiological effects, by similarly accomplishing a warning alarm, or stopping the 3D display or mitigating the 3D effect as illustrated by example in the above-described embodiments, it is possible to prevent or mitigate negative physiological effects from viewing the 3D display.

(Variation on Embodiment 3)

Similar to the above-described embodiment, a different embodiment in a display device such as a digital photo frame whose screen orientation can be changed will be explained.

Some digital photo frames can differentiate portrait displays and landscape displays, and can make them be displayed accordingly.

Figure 18A:
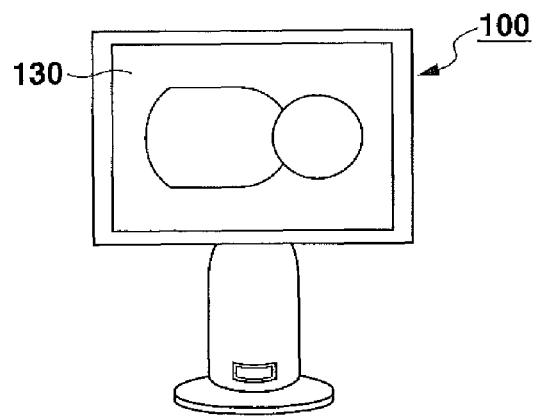
FIG. 18A shows another example of display control according to a variation of the third embodiment of the present invention, and is a drawing showing a regular 2D display example on the display unit when the display unit is in a landscape orientation state and a portrait image is displayed.

For example, when the digital photo frame is in a landscape (sideways) status and a portrait human photo is displayed, as shown in FIG. 18A, if that human photo is set to portrait display, there is a function that automatically rotates (shrinks) and displays the photo such that the person is upright, even if the digital photo frame is in a landscape status.

Figure 18B:
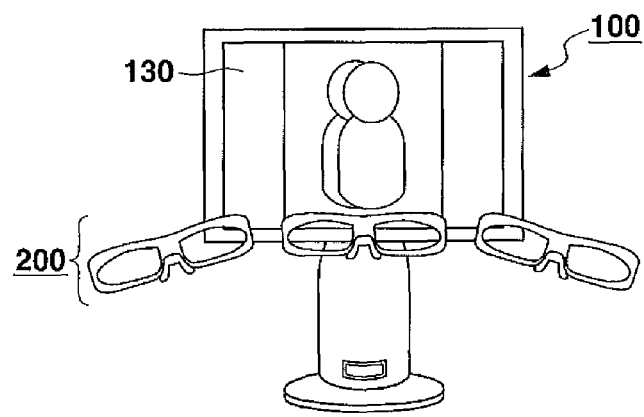
FIG. 18B shows a 3D display example on the display unit when the portrait image shown in FIG. 18A has a portrait setting.

In this case, a 3D image is displayed through a 2D/3D conversion so that the binocular images are shifted in the left-right direction as in FIG. 18B.

Figure 18C:
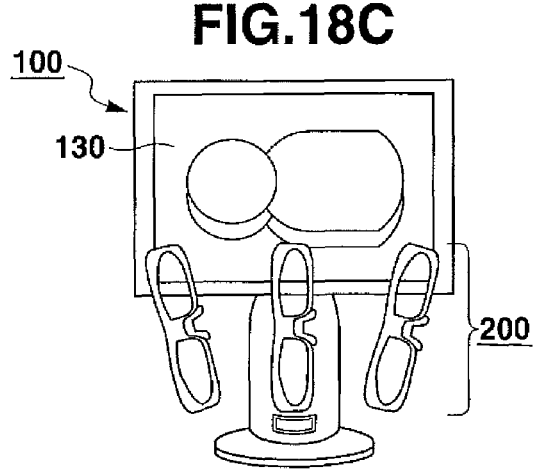
FIG. 18C shows a 3D display example on the display unit when the posture of the display assistance device changes from the state shown in FIG. 18B.

However, when the viewer is in a sideways posture as shown in FIG. 18C, this automatic rotation display function is canceled and the image is rotated to a direction corresponding to the posture (orientation) of the display assistance device 200, and similarly a 3D display is made corresponding to the posture (orientation) of the display assistance device 200.

In this kind of digital photo frame, by using not just the posture (orientation) of the display assistance device 200 but also the screen orientation as a factor, more multi-purpose display control can be accomplished.

(Embodiment 4)

In the 3D display illustrated by example in the above-described embodiments, the target to be viewed three-dimensionally when viewing not actually appears as a three-dimensional object but can be recognized three-dimensionally in the brain from binocular parallax, so recognition as a 3D display is accomplished by a physiological stereopsis function.

Formation of a stereopsis function through binocular parallax is said to not be completed until around age 5-6, so there are concerns about negative physiological effects when infants in whom formation of a stereopsis function is immature view 3D displays.

In the above-described embodiments, a wearing detection unit 220 for detecting that the display assistance device 200 is being worn by a viewer is provided, and a wearing detection unit 220A located at the position of the nose pad and a wearing detection unit 220B located at the position of the temple were illustrated by example (see FIGS. 4A and 4B).

If the size of the display assistance device 200 as a whole is a size that does not fit the head of an infant or young child, for example, it is possible to determine whether or not a person wearing the display assistance device 200 is a younger person who should not be viewing 3D displays, on the basis of the detection results from the wearing detection unit 220A and the wearing detection unit 220B.

That is to say, if the display assistance device 200 is formed so as to be a size too large for a young person with a small head, when this young person puts on the display assistance device 200, if the nose pad is matched to the face, the temple portion does not fit, and if the temple is matched to the face, the nose pad portion does not fit.

That is to say, because contact by only one out of the wearing detection unit 220A or the wearing detection unit 220B is detected, when this kind of detection result is sent as status information from the display assistance device 200 to the display device 100, on the display device 100 side a warning alert screen such as that shown in FIG. 12A is displayed, for example, notifying the person himself or other nearby the person that viewing should not be done, and in addition it is possible to make viewing of the 3D display impossible by making it a 2D display as shown in FIG. 12B.

Through this kind of action, it is possible to prevent a person who should not be viewing a 3D display in the perspective of physiological development status from watching a 3D display, and it is possible to prevent or mitigate negative physiological effects caused by viewing a 3D display.

When this kind of action is not accomplished, the wearing detection unit 220 comprised in the display assistance device 200 may be either the wearing detection unit 220A or the wearing detection unit 220B.

As explained above, by applying the present invention as in the above-described embodiments, it is possible to mitigate negative physiological effects while also increasing the degree of freedom in viewing a 3D display.

The above-described embodiments are intended to be illustrative and not limiting on the range of applications of the present invention.

That is to say, various applications are possible and all variations are included in the scope of the present invention.

For example, in the above-described embodiments, the posture detection action of the display assistance device 200 was accomplished with a periodic execution timing, but this is not intended to be limiting, for the sensors comprising the posture detection unit 250 may accomplish detection actions constantly and when a posture change is detected, a display control process may be accomplished.

In addition, in the above-described embodiments, a television display device and a digital photo frame were illustrated as examples of the display device 100, but this is not intended to be limiting, for it is possible for the present invention to be applied to various display devices such as PC monitors.

The 3D display illustrated by example in the above-described embodiments was explained as being made by a display device that accomplishes a 3D display by displaying through time division images for the left eye and images for the right eye and synchronizing with high-speed shutters of the display assistance device (eyeglasses that cause a 3D display to be recognized), so that the left and right images displayed alternately by the display device are separated, but there are various other types as systems for realizing a 3D display using the display assistance device (eyeglasses that cause a 3D display to be recognized).

As systems on the display device side, there are primarily four varieties.

1) The above-described time division system (frame sequential system)

2) A system for division by display area

A field sequential system (line by line system) in which images for the right eye and images for the left eye are assigned to every odd scanning lines and even scanning lines respectively.

A checker sampling system in which images for the right eye and images for the left eye are assigned to every neighboring pixels.

3) An anaglyph system for partitioning by color (red and blue)

4) A system for partitioning by polarization direction (The above are at times combined with time division).

In addition, the display assistance device (eyeglasses) partitions images into images for the left eye and images for the right eye, and systems for such are broadly divided into two categories.

a) Active System

The above-described system for partitioning the left and right images alternately displayed by the display device, using the high-speed shutters of the synchronizing eyeglasses.

b) Passive System

A system in which an image is partitioned and displayed by applying color to or polarizing the images (light) emitted from the display device, and it is partitioned by an optical filter (red/blue or polarizing filter) in the eyeglasses.

(In the case of polarized light control, the shutter function may be provided on the display device side.)

By combining these systems, a 3D display can be realized.

Because the present invention is intended to resolve the problem of the binocular parallax direction in the images and the left-right direction of the viewer diverging when synthesizing and recognizing images for the right eye and images for the left eye in the brain, if the display assistance device is used, similar application is possible with any of the above-described systems (or combinations thereof).

The case in which the display assistance device (eyeglasses) is of passive system differs in that the synchronization control between the display device and the display assistance device discussed in the above-described embodiments is no longer necessary.

In addition, by applying a program to an existing display device capable of a 3D display that can communicate with the display assistance device 200 of the above-described embodiments, it is possible to cause such to function as a display device according to the present invention.

In this case, it is possible to cause such to function as a display device according to the present invention by causing a program for realizing functions similar to the above-described functions to be executed on a computer (CPU and/or the like) similar to the controller 110 illustrated by example in the above-described embodiments.

The method of applying such a program is arbitrary, and for example this can be applied by being stored on a memory medium such as a CD-ROM, a memory card and/or the like, or can be applied via a communication medium such as the Internet, for example.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A display system comprising:
a display device which accomplishes a 3D display by displaying images for a right eye of a viewer and images for a left eye of the viewer; and
a display assistance device which separates the display into the images for the left eye and the images for the right eye, thereby allowing the viewer to see the displayed images;
wherein the display assistance device comprises:
a status detector which detects an inclination of the display assistance device; and
a transmitter which transmits status information indicating detection results from the status detector to the display device; and
wherein the display device comprises:
a receiver which receives the status information transmitted by the transmitter;
an inclination status discriminator which determines whether the inclination included in the status information received from the transmitter is within an angular tolerance range with respect to a certain angle of 90° units capable of recognition by the viewer viewing the 3D display; and
a display controller which controls the 3D display such that, when the inclination status discriminator determines that the inclination is within the angular tolerance range, the display controller controls a display direction of the images in 90° units such that a direction of inclination is substantially equivalent to the display direction, and such that a direction of parallax of the 3D display corresponds to the controlled display direction.

2. The display system according to claim 1, wherein:
the status detector further detects a wearing status of the display assistance device on the viewer viewing a display screen of the display device;
the transmitter transmits the wearing status as part of the status information; and
the display controller controls the images relating to the 3D display in accordance with the wearing status.

3. The display system according to claim 1, wherein the images for the right eye and the images for the left eye are displayed with at least one of time division and spatial division.

4. The display system according to claim 1, wherein the images for the right eye and the images for the left eye are displayed divided by polarization direction.

5. A display device which accomplishes a 3D display by cooperating with a display assistance device which separates the display into images for a left eye of a viewer and images for a right eye of the viewer, thereby allowing the viewer to see the displayed images, the display device comprising:
a receiver which receives status information indicating an inclination of the display assistance device detected by the display assistance device;
an inclination status discriminator which determines whether the inclination included in the status information received by the receiver is within an angular tolerance range with respect to a certain angle of 90° units capable of recognition by the viewer viewing the 3D display; and
a display controller which controls the 3D display such that, when the inclination status discriminator determines that the inclination is within the angular tolerance range, the display controller controls a display direction of the images in 90° units such that a direction of inclination is substantially equivalent to the display direction, and such that a direction of parallax of the 3D display corresponds to the controlled display direction.

6. The display device according to claim 5, wherein the display controller controls a display size of the images relating to the 3D display in accordance with said inclination when the inclination status discriminator determines that the inclination of the display assistance device is within the angular tolerance range.

7. The display device according to claim 5, wherein the display device issues a warning alert to the viewer wearing the display assistance device when the inclination status discriminator determines that the inclination of the display assistance device is not within the angular tolerance range.

8. The display device according to claim 7, wherein the display device issues the warning alert to the viewer wearing the display assistance device by outputting the warning alert from the display controller.

9. The display device according to claim 5, wherein the display controller mitigates an effect of the 3D display when the inclination status discriminator determines that the inclination of the display assistance device is not within the angular tolerance range.

10. The display device according to claim 5, further comprising a wearing status determiner which determines whether or not a wearing status of the display assistance device on the viewer, which is included as part of the status information received by the receiver, is appropriate;
wherein the display device issues a warning alert to the viewer wearing the display assistance device when the wearing status determiner determines that the wearing status is not appropriate.

11. The display device according to claim 5, further comprising a wearing status determiner which determines whether or not a wearing status of the display assistance device on the viewer, which is included as part of the status information received by the receiver, is appropriate;
wherein the display controller mitigates an effect of the 3D display when the wearing status determiner determines that the wearing status is not appropriate.

12. The display device according to claim 5, further comprising an orientation detector which detects an orientation of the display;
wherein the display controller controls the 3D display based on the status information received by the receiver and detection results from the orientation detector.

13. The display device according to claim 5, wherein the display controller controls a display direction of the images by signal processing.

14. A display assistance device which realizes a 3D display by separating images displayed by a display device into images for a right eye of a viewer and images for a left eye of the viewer, the display assistance device comprising:
a status detector which detects an inclination of the display assistance device;
an inclination status discriminator which determines whether the inclination detected by the status detector is within an angular tolerance range with respect to a certain angle of 90° units capable of recognition by the viewer viewing the 3D display;
a status information generator which generates status information indicating a result of the determination by the inclination status discriminator, wherein when the inclination status discriminator determines that the inclination is within the angular tolerance range, the status information generated by the status information generator is used by the display device to control display actions of the display device; and a transmitter which transmits, to the display device, the status information generated by the status information generator.

15. The display assistance device according to claim 14, wherein when the inclination status discriminator determines that the inclination is not within the angular tolerance range within which the viewer can recognize the 3D display, the display assistance device issues a warning alert to the viewer.

16. A display assistance device which realizes a 3D display by separating images displayed by a display device into images for a right eye of a viewer and images for a left eye of the viewer, the display assistance device comprising:

a wearing status determiner which uses two sensors to determine whether or not a wearing status of the display assistance device on the viewer viewing a screen of the display device is appropriate;

wherein when the wearing status determiner determines that the wearing status is not appropriate, the display assistance device issues a warning alert to the viewer.

17. A display assistance device which realizes a 3D display by separating images displayed by a display device into images for a right eye of a viewer and images for a left eye of the viewer, the display assistance device comprising:

a signal generator which generates an alternating synchronization signal for accomplishing a shutter action synchronously with the images for the right eye and the images for the left eye which are displayed with time division;

a status detector which detects at least one of an inclination of the display assistance device and a wearing status of the display assistance device on the viewer viewing a display screen of the display device; and a transmitter which transmits the alternating synchronization signal generated by the signal generator, the transmitter not being configured to receive a result of the detection by the status detector.

18. The display assistance device according to claim 14, wherein:

the status detector further detects a wearing status of the display assistance device on the viewer viewing a display screen of the display device;

the status detector further comprises a wearing status determiner which determines whether or not the wearing status is appropriate; and when the wearing status determiner determines that the wearing status is appropriate, the status information generated by the status information generator, which further includes results of the detection by the status detector and the determination by the wearing status determiner, is used by the display device to control display actions of the display device.

\* \* \* \* \*